(12) United States Patent
Kim et al.

(10) Patent No.: US 11,422,656 B2
(45) Date of Patent: Aug. 23, 2022

(54) TOUCH SENSING UNIT AND DISPLAY DEVICE INCLUDING THE SAME

(71) Applicant: SAMSUNG DISPLAY CO., LTD., Yongin-si (KR)

(72) Inventors: Eun Young Kim, Asan-si (KR); Deok Jung Kim, Cheonan-si (KR); Gyeong Nam Bang, Seoul (KR); Hye Yun Han, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/332,031

(22) Filed: May 27, 2021

(65) Prior Publication Data
US 2022/0137742 A1    May 5, 2022

(30) Foreign Application Priority Data
Oct. 29, 2020 (KR) .......................... 10-2020-0141948

(51) Int. Cl.
*G06F 3/041* (2006.01)

(52) U.S. Cl.
CPC .......... *G06F 3/0416* (2013.01); *G06F 3/0412* (2013.01)

(58) Field of Classification Search
None
See application file for complete search history.

(56) References Cited

U.S. PATENT DOCUMENTS

2015/0370356 A1* 12/2015 Hwang ............... G06F 3/04164
                                                                  345/173
2018/0182822 A1*  6/2018 Seo ..................... H01L 27/3276

FOREIGN PATENT DOCUMENTS

| KR | 10-1506128 | 4/2015 |
| KR | 10-1735569 | 5/2017 |
| KR | 10-2005499 | 7/2019 |
| KR | 10-2111402 | 5/2020 |

* cited by examiner

*Primary Examiner* — Stephen T. Reed
(74) *Attorney, Agent, or Firm* — F. Chau & Associates, LLC

(57) ABSTRACT

A touch sensing unit includes driving electrode groups which are arranged in a first direction, each of the driving electrode groups including a plurality of driving electrodes electrically connected in a second direction intersecting the first direction, sensing electrode groups which are arranged in the second direction, each of the sensing electrode groups including plurality of sensing electrodes electrically connected in the first direction, driving lines which are connected to the driving electrode groups, respectively, a first sensing line group including sensing lines respectively connected to first sensing electrode groups among the sensing electrode groups, and a second sensing line group including sensing lines respectively connected to second sensing electrode groups among the sensing electrode groups. The sensing lines of the first sensing line group have the same width.

24 Claims, 25 Drawing Sheets

TOUCH SENSING UNIT AND DISPLAY DEVICE INCLUDING THE SAME

CROSS-REFERENCE TO RELATED APPLICATIONS

This application claims priority under 35 U.S.C. § 119 to Korean Patent Application No. 10-2020-0141948, filed on Oct. 29, 2020, the disclosure of which is incorporated by reference herein in its entirety.

TECHNICAL FIELD

Embodiments of the present disclosure relate to a touch sensing unit and a display device including the same.

DISCUSSION OF THE RELATED ART

Display devices are being applied to various electronic devices such as, for example, smartphones, digital cameras, notebook computers, navigation devices, and smart televisions.

A display device may include a touch sensing unit that senses a user's touch as one of a variety of input interfaces. Such a touch sensing unit may include a plurality of touch electrodes driven in a capacitive manner to sense a user's touch.

Such a touch sensing unit may include a plurality of touch lines connecting a plurality of touch electrodes and a plurality of touch pads. Since the touch lines have different lengths, resistances of the touch lines are designed in consideration of the lengths of the touch lines.

SUMMARY

Aspects of the present disclosure provide a touch sensing unit in which the trend of a resistance slope of a plurality of touch lines can be designed uniformly despite a process error.

Aspects of the present disclosure also provide a display device including a touch sensing unit in which the trend of a resistance slope of a plurality of touch lines can be designed uniformly despite a process error.

According to an embodiment of the present disclosure, a touch sensing unit includes a plurality of driving electrode groups arranged in a first direction, each of the driving electrode groups including a plurality of driving electrodes electrically connected to each other in a second direction intersecting the first direction. The touch sensing unit further includes a plurality of sensing electrode groups arranged in the second direction, each of the sensing electrode groups including a plurality of sensing electrodes electrically connected to each other in the first direction. The touch sensing unit further includes a plurality of driving lines connected to corresponding ones of the driving electrode groups, respectively, a first sensing line group including sensing lines respectively connected to corresponding ones of first sensing electrode groups among the sensing electrode groups, and a second sensing line group including sensing lines respectively connected to corresponding ones of second sensing electrode groups among the sensing electrode groups. Widths of the sensing lines of the first sensing line group are substantially equal to each other.

In an embodiment, widths of the sensing lines of the second sensing line group are substantially equal to each other.

In an embodiment, the widths of the sensing lines of the first sensing line group and the widths of the sensing lines of the second sensing line group are substantially equal to each other.

In an embodiment, each of the sensing lines of the first sensing line group is connected to a first side of a corresponding first sensing electrode group among the first sensing electrode groups, and each of the sensing lines of the second sensing line group is connected to a second side of a corresponding second sensing electrode group among the second sensing electrode groups.

In an embodiment, a length of any one of the sensing lines of the first sensing line group is smaller than a length of any one of the sensing lines of the second sensing line group.

In an embodiment, a resistance slope of the sensing lines of the first sensing line group is different from a resistance slope of the sensing lines of the second sensing line group.

In an embodiment, the resistance slope of the sensing lines of the first sensing line group is greater than the resistance slope of the sensing lines of the second sensing line group.

In an embodiment, a resistance slope of the sensing lines of the first sensing line group is constant.

In an embodiment, a resistance slope of the sensing lines of the second sensing line group is variable.

In an embodiment, widths of the driving lines are substantially equal to each other.

In an embodiment, resistances of the driving lines are substantially equal to each other.

In an embodiment, a width of any one of the driving lines is different from a width of another one of the driving lines.

In an embodiment, the width of each of the sensing lines of the first sensing line group and a width of each of the sensing lines of the second sensing line group is smaller than a maximum width of each of the driving lines.

In an embodiment, the width of each of the sensing lines of the first sensing line group and a width of each of the sensing lines of the second sensing line group is greater than a minimum width of each of the driving lines.

In an embodiment, the sensing lines of the first sensing line group include a first sensing line connected to a first sensing electrode group among the first sensing electrode groups and a second sensing line connected to a second sensing electrode group among the second sensing electrode groups. A width of the second sensing line at a portion overlapping the first sensing electrode group in the first direction is different from a width of the second sensing line at a portion overlapping the second sensing electrode group in the first direction.

In an embodiment, a length of the secondسensing line is greater than a length of the first sensing line.

In an embodiment, the width of the second sensing line at the portion overlapping the first sensing electrode group in the first direction is smaller than the width of the second sensing line at the portion overlapping the second sensing electrode group in the first direction.

In an embodiment, widths of the first sensing line and the second sensing line at the portion overlapping the first sensing electrode group in the first direction are substantially equal to each other.

According to an embodiment of the present disclosure, a touch sensing unit includes a plurality of driving electrode groups arranged in a first direction, each of the driving electrode groups including a plurality of driving electrodes electrically connected to each other in a second direction intersecting the first direction. The touch sensing unit further includes a plurality of sensing electrode groups arranged in the second direction, each of the sensing electrode groups including a plurality of sensing electrodes electrically connected to each other in the first direction. The touch sensing unit further includes a plurality of driving lines connected to corresponding ones of the driving electrode groups, respectively, a first sensing line group including sensing lines respectively connected to corresponding ones of first sensing electrode groups among the sensing electrode groups, and a second sensing line group including sensing lines respectively connected to corresponding ones of second sensing electrode groups among the sensing electrode groups. A resistance slope of the sensing lines of the first sensing line group is different from a resistance slope of the sensing lines of the second sensing line group.

In an embodiment, the resistance slope of the sensing lines of the first sensing line group is greater than the resistance slope of the sensing lines of the second sensing line group.

In an embodiment, the resistance slope of the sensing lines of the first sensing line group is constant.

In an embodiment, the resistance slope of the sensing lines of the second sensing line group is variable.

According to an embodiment of the present disclosure, a display device includes a display unit including a display area having a plurality of pixels that display an image, and a touch sensing unit including a touch sensing area overlapping the display area. The touch sensing unit includes a plurality of driving electrode groups arranged in a first direction, each of the driving electrode groups including a plurality of driving electrodes electrically connected to each other in a second direction intersecting the first direction. The touch sensing unit further includes a plurality of sensing electrode groups arranged in the second direction, each of the sensing electrode groups including a plurality of sensing electrodes electrically connected to each other in the first direction. The touch sensing unit further includes a plurality of driving lines connected to corresponding ones of the driving electrode groups, respectively, a first sensing line group including sensing lines respectively connected to corresponding ones of first sensing electrode groups among the sensing electrode groups, and a second sensing line group including sensing lines respectively connected to corresponding ones of second sensing electrode groups among the sensing electrode groups. Widths of the sensing lines of the first sensing line group are substantially equal to each other.

BRIEF DESCRIPTION OF THE DRAWINGS

The above and other features of the present disclosure will become more apparent by describing in detail embodiments thereof, with reference to the accompanying drawings, in which.

DETAILED DESCRIPTION

Figure 1:
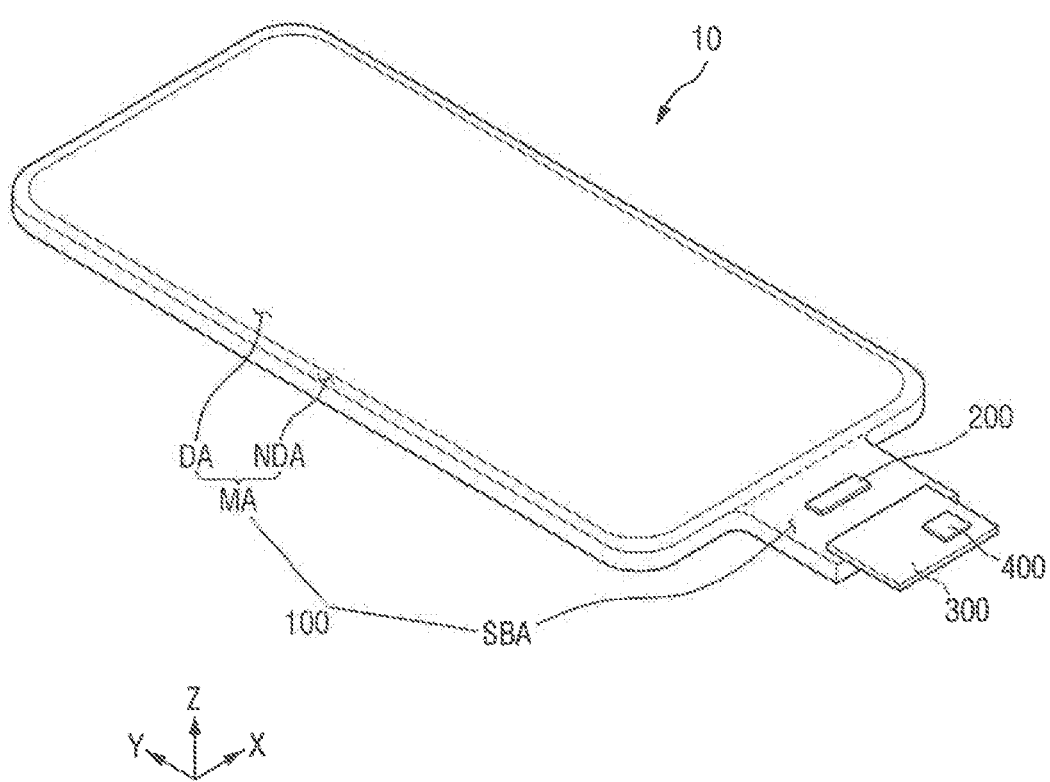
FIG. 1 is a perspective view of a display device according to an embodiment.

Embodiments of the present disclosure will be described more fully hereinafter with reference to the accompanying drawings. Like reference numerals may refer to like elements throughout the specification and the accompanying drawings.

Herein, when two or more elements or values are described as being substantially the same as or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of the ordinary skill in the art. Further, it is to be understood that while parameters may be described herein as having "about" a certain value, according to exemplary embodiments, the parameter may be exactly the certain value or approximately the certain value within a measurement error as would be understood by a person having ordinary skill in the art. Other uses of these terms and similar terms to describe the relationship between components should be interpreted in a like fashion.

It will be understood that when a component, such as a film, a region, a layer, or an element, is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. It will also be understood that when a component is referred to as "covering" another component, it can be the only component covering the other component, or one or more intervening components may also be covering the other component. Other words use to describe the relationship between elements may be interpreted in a like fashion.

It will be further understood that descriptions of features or aspects within each embodiment are available for other similar features or aspects in other embodiments, unless the context clearly indicates otherwise. Accordingly, all features and structures described herein may be mixed and matched in any desirable manner.

As used herein, the singular forms "a", "an" and "the" are intended to include the plural forms as well, unless the context clearly indicates otherwise.

Spatially relative terms, such as "below", "lower", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" other elements or features would then be oriented "above" the other elements or features. Thus, the term "below" may encompass both an orientation of above and below.

When a feature is said to extend, protrude, or otherwise follow a certain direction, it will be understood that the feature may follow said direction in the negative, i.e., opposite direction. Accordingly, the feature is not limited to follow exactly one direction, and may follow along an axis formed by the direction, unless the context clearly indicates otherwise.

Figure 2:
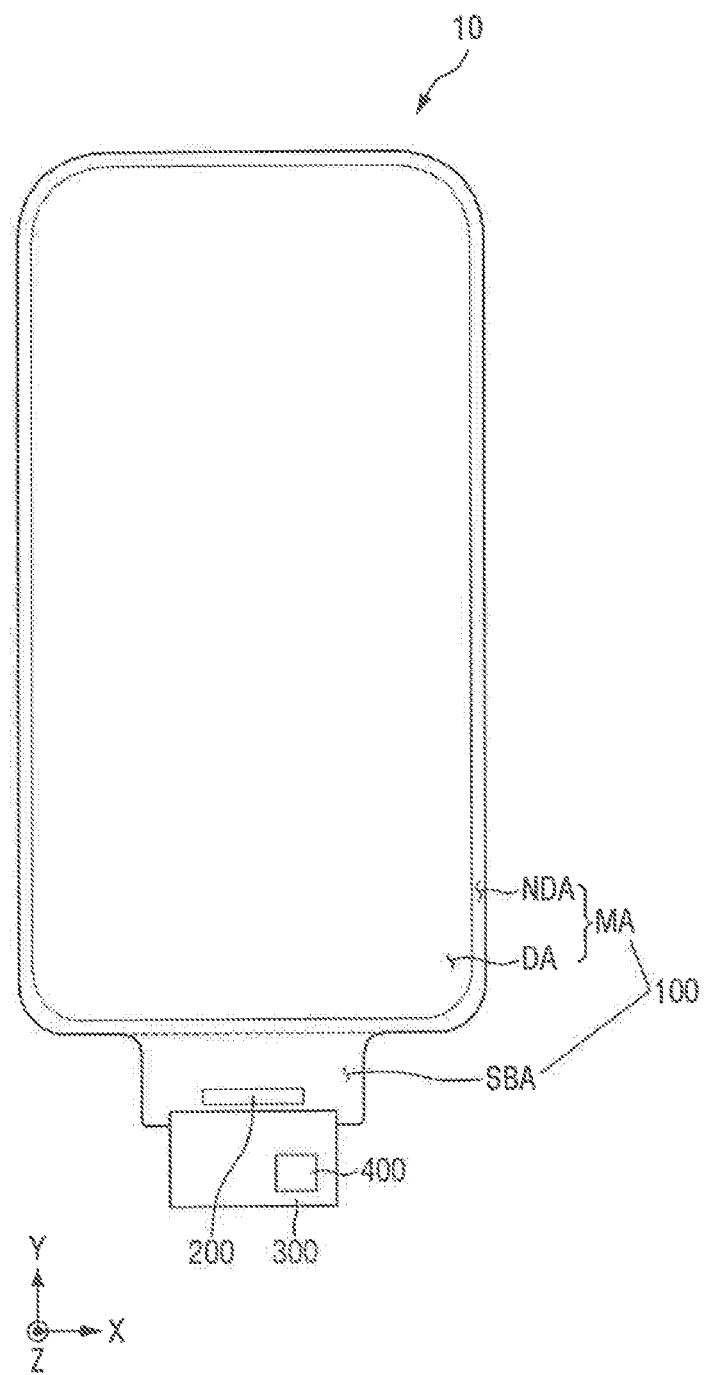
FIG. 2 is a plan view of a display device according to an embodiment.
Figure 3:
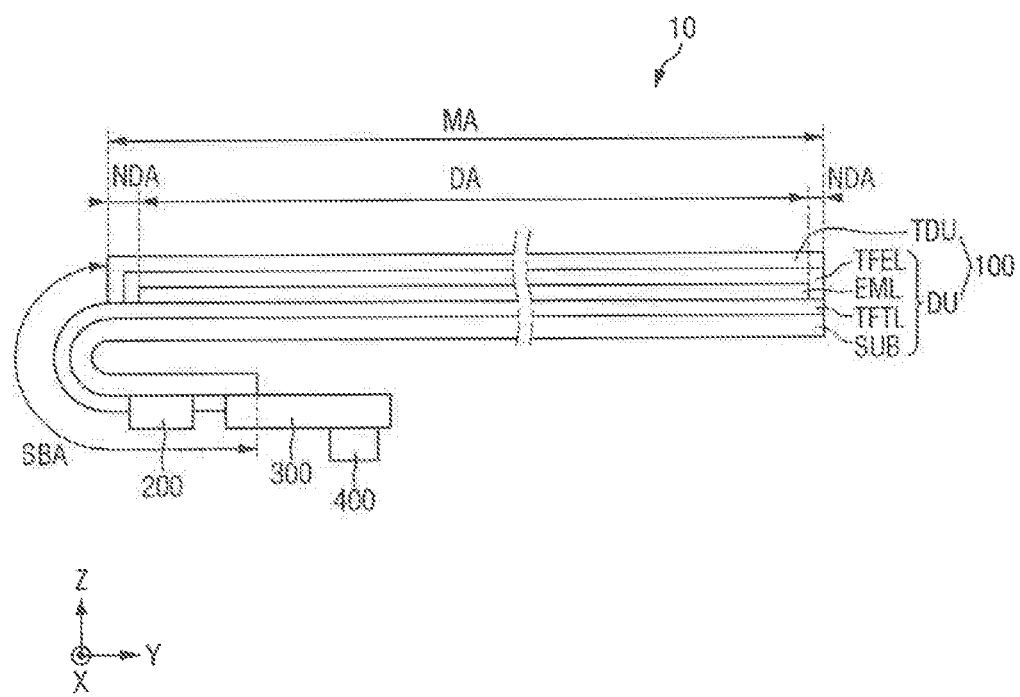
FIG. 3 is a side view of a display device according to an embodiment.

FIG. 1 is a perspective view of a display device 10 according to an embodiment. FIG. 2 is a plan view of the display device 10 according to an embodiment. FIG. 3 is a side view of the display device 10 according to an embodiment.

Referring to FIGS. 1 through 3, the display device 10 according to an embodiment may be applied to portable electronic devices such as, for example, mobile phones, smartphones, tablet personal computers (PCs), mobile communication terminals, electronic notebooks, electronic books, portable multimedia players (PMPs), navigation devices, and ultra-mobile PCs (UMPCs). Alternatively, the display device 10 according to an embodiment may be applied as a display unit of television, a notebook computer, a monitor a billboard, or an Internet of Things (IoT) device. Alternatively, the display device 10 according to an embodiment array be applied to wearable devices such as, for example, smartwatches, watch phones, and head-mounted displays (HMDs). Alternatively, the display device 10 according to an embodiment may be applied to a dashboard of a vehicle, a center fascia of a vehicle, a center information display (CID) disposed on a dashboard of a vehicle, a room mirror display in place of a side mirror of a vehicle, or a display disposed on the back of a front seat, used as an entertainment device, for rear-seat passengers of a vehicle. However, the display device 10 is not limited thereto.

The display device 10 according to an embodiment may be, for example, a light emitting display device such as an organic light emitting diode (MED) display device using organic light emitting diodes, a quantum dot light emitting display device including quantum dot light emitting layers, an inorganic light emitting display device including inorganic semiconductors, or a micro or nano light emitting display device using micro or nano light emitting diodes. Although a case in which the display device 10 is described as being an OLED display device will be mainly described below, embodiments of the present disclosure are not limited thereto.

The display device 10 according to an embodiment includes a display panel 100, a display driving circuit 200, a display circuit board 300, and a touch driving circuit 400.

The display panel 100 may be shaped as a rectangle having short sides in a first direction (X-axis direction) and long sides in a second direction (Y-axis direction) intersecting the first direction (X-axis direction). Each corner there a short side extending in the first direction (X-axis direction) meets a long side extending in the second direction (Y-axis direction) may be rounded with a predetermined curvature or may be right-angled. The planar shape of the display panel 100 is not limited to a quadrangular shape, but rather, may also be another polygonal shape, a circular shape, or an oval shape. The display panel 100 may be formed flat, however, embodiments of the present disclosure are not limited thereto. For example, the display panel 100 may include curved parts formed at left and right ends and having a constant or varying curvature. In addition, the display panel 100 may be flexible so that it can be curved, bent, folded or oiled.

The display panel 100 includes a main area MA and a sub area SBA.

The main area MA includes a display area DA in which an image is displayed and a non-display area NDA located around the display area DA in which an image is not displayed. The display area DA includes pixels that display an image. The sub area SBA may protrude in the second direction (Y-axis direction) from a side of the main area MA.

The sub area SBA is illustrated as being unfolded in FIGS. 1 and 2, and is illustrated as being bent in FIG. 3. When the sub area SBP is bent as illustrated in FIG. 3, the sub area SBA may be disposed on a lower surface of the display panel 100. When the sub area SBA is bent, the sub area SBA may be overlapped by the main area MA in a third direction (Z-axis direction), which is a thickness direction of a substrate SUB. The display driving circuit 200 may be disposed in the sub area SBA.

In addition, the display panel 100 includes the substrate SUB, a thin-film transistor layer TFTL, a light emitting element layer EML, an encapsulation layer TFEL, and a touch sensing unit TDU, as illustrated in FIG. 3.

The thin-film transistor layer TFTL may be disposed on the substrate SUB. The thin-film transistor layer TFTL may be disposed in the main area MA and the sub area SBA. The thin-film transistor layer TFTL includes thin-film transistors.

The light emitting element layer EML may be disposed on the thin-film transistor layer TFTL. The light emitting element layer EML may be disposed in the display area DA of the main area MA. The light emitting element layer EML includes light emitting elements disposed in emission parts.

The encapsulation layer TFEL may be disposed on the light emitting element layer EML. The encapsulation layer TFEL may be disposed in the display area DA and the non-display area NDA of the main area MA. The encapsulation layer TFEL includes at least one inorganic layer and at least one organic layer that encapsulates the light emitting element layer EML.

The touch sensing unit TDU may be disposed on the encapsulation layer TFEL. The touch sensing unit TDU may be disposed in the display area DA and the non-display area NDA of the main area MA. The touch sensing unit TDU may detect a touch of a person or an object using touch electrodes.

A cover window may be disposed on the touch sensing unit TDU. The cover window may protect an upper part of the display panel 100. The cover window may be attached onto the touch sensing unit TDU by a transparent adhesive member such as, for example, an optically clear adhesive (OCA) film or an optically clear resin. The cover window may be an inorganic material such as, for example, glass, or an organic material such as, for example, plastic or a polymer material. To prevent or reduce a reduction in visibility of an image due to reflection of external light, a polarizing film may be additionally disposed between the touch sensing unit TDU and the cover window.

The display driving circuit 200 may generate signals and voltages for driving the display panel 100. The display driving circuit 200 may be formed as an integrated circuit and attached onto the display panel 100 using, for example, a chip-on-glass (COG) method, a chip-on-plastic (COP) method, or an ultrasonic bonding method. However, embodiments of the present disclosure are not limited thereto. For example, in some embodiments, the display driving circuit 200 may be attached onto the display circuit board 300 using a chip-on-film (COF) method.

The display circuit board 300 may be attached to an end of the sub area SBA of the display panel 100. Therefore, the display circuit board 300 may be electrically connected to the display panel 100 and the display driving circuit 200. The display panel 100 and the display driving circuit 200 may receive, for example, digital video data, timing signals, and driving voltages through the display circuit board 300. The display circuit board 300 may be, for example, a flexible printed circuit board, a printed circuit board, or a flexible film such as a chip-on-film.

The touch driving circuit 400 may be disposed on the display circuit board 300. The touch driving circuit 400 may be formed as an integrated circuit and attached to the display circuit board 300.

The touch driving circuit 400 may be electrically connected to a plurality of driving electrodes and a plurality of sensing electrodes of the touch sensing unit TDU. The touch driving circuit 400 may transmit a touch driving signal to the driving electrodes and sense the amount of charge change in mutual capacitance of each of a plurality of touch nodes through the sensing electrodes. The touch driving circuit 400 may determine a user's touch or proximity according to the amount of charge change in the mutual capacitance of each of the touch nodes. The user's touch indicates that an object such as, for example, a user's finger or a pen, directly contacts a surface of the cover window disposed on the touch sensing unit TDU. The user's proximity indicates that an object such as, for example, a user's finger or a pen, is positioned (e.g., hovers) above a surface of the cover window.

In some embodiments, the display panel 100 includes a color filter layer including color filters. The color filter layer may reduce reflection of external light by, for example, metal lines and metal electrodes of the display panel 100. Since a separate antireflection member such as a polarizing plate may not be attached onto the display panel 100 in this case, the manufacturing cost of the display device 10 can be reduced.

Figure 4:
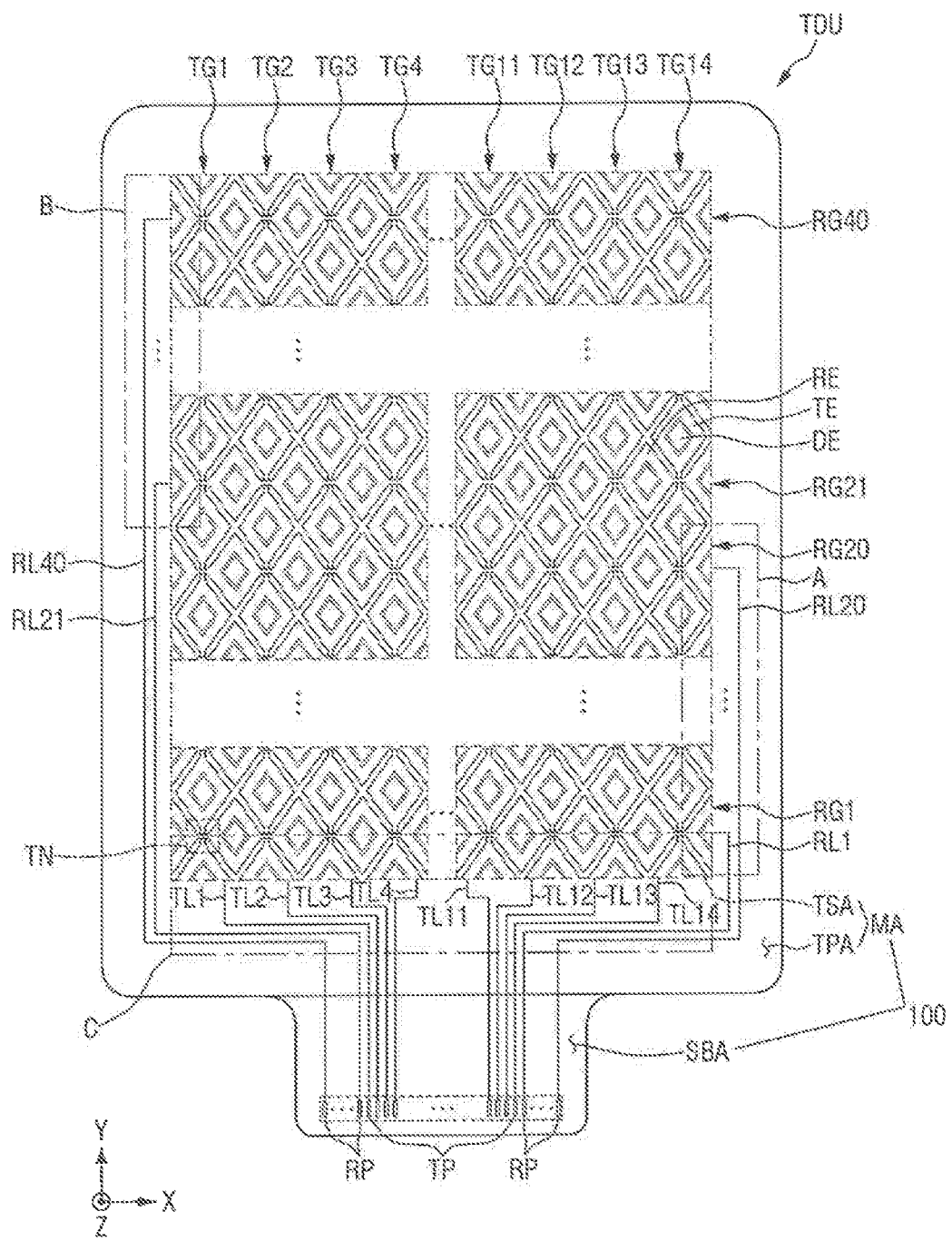
FIG. 4 is a layout view schematically illustrating an example of a touch sensing unit of FIG. 3.

FIG. 4 is a layout view schematically illustrating an example of the touch sensing unit TDU of FIG. 3.

In FIG. 4, the description will focus on a case in which the touch sensing unit TDU includes two types of electrodes, for example, driving electrodes TE and sensing electrodes RE, and is driven in a mutual capacitance manner in which a touch driving signal is transmitted to the driving electrodes TE and then the amount of charge change in mutual capacitance of each of a plurality of touch nodes is sensed through the sensing electrodes RE.

Referring to FIG. 4, the touch sensing unit TDU includes a touch sensing area TSA for sensing a user's touch and a touch peripheral area TPA disposed around the touch sensing area TSA. The touch sensing area TSA may overlap the display area DA of FIGS. 1 through 3, and the touch peripheral area TPA may overlap the non-display area NDA of FIGS. 1 through 3.

The touch sensing unit TDU includes a plurality of driving electrode groups TG1 through TG14, a plurality of sensing electrode groups RG1 through RG40, a plurality of driving lines TL1 through TL14, a plurality of sensing lines RL1 through RL40, a plurality of driving pads TP, and a plurality of sensing pads RP.

The driving electrode groups TG1 through TG14 and the sensing electrode groups RG1 through RG40 may be disposed in the touch sensing area TSA. The driving lines TL1 through TL14, the sensing lines RL1 through RL40, the driving pads TP, and the sensing pads RP may be disposed in the touch peripheral area TPA.

The driving electrode groups TG1 through TG14 may be disposed in the first direction (X-axis direction). The driving electrode groups TG1 through TG14 may be disposed from a left side to a right side of the touch sensing area TSA. For example, a first driving electrode group TG1 may be disposed on a leftmost side of the touch sensing area TSA, a second driving electrode group TG2 may be disposed on the right side of the first driving electrode group TG1, a third driving electrode group TG3 may be disposed on the right side of the second driving electrode group TG2, and a fourth driving electrode group TG4 may be disposed on the right side of the third driving electrode group TG3. The driving electrode groups may be repeated, and a fourteenth driving electrode group TG14 may be disposed on a rightmost side of the touch sensing area TSA, a thirteenth driving electrode group TG13 may be disposed on the left side of the fourteenth driving electrode group TG14, a twelfth driving electrode group TG12 may be disposed on the left side of the thirteenth driving electrode group TG13, and an eleventh driving electrode group TG11 may be disposed on the left side of the twelfth driving electrode group TG12.

Figure 5:
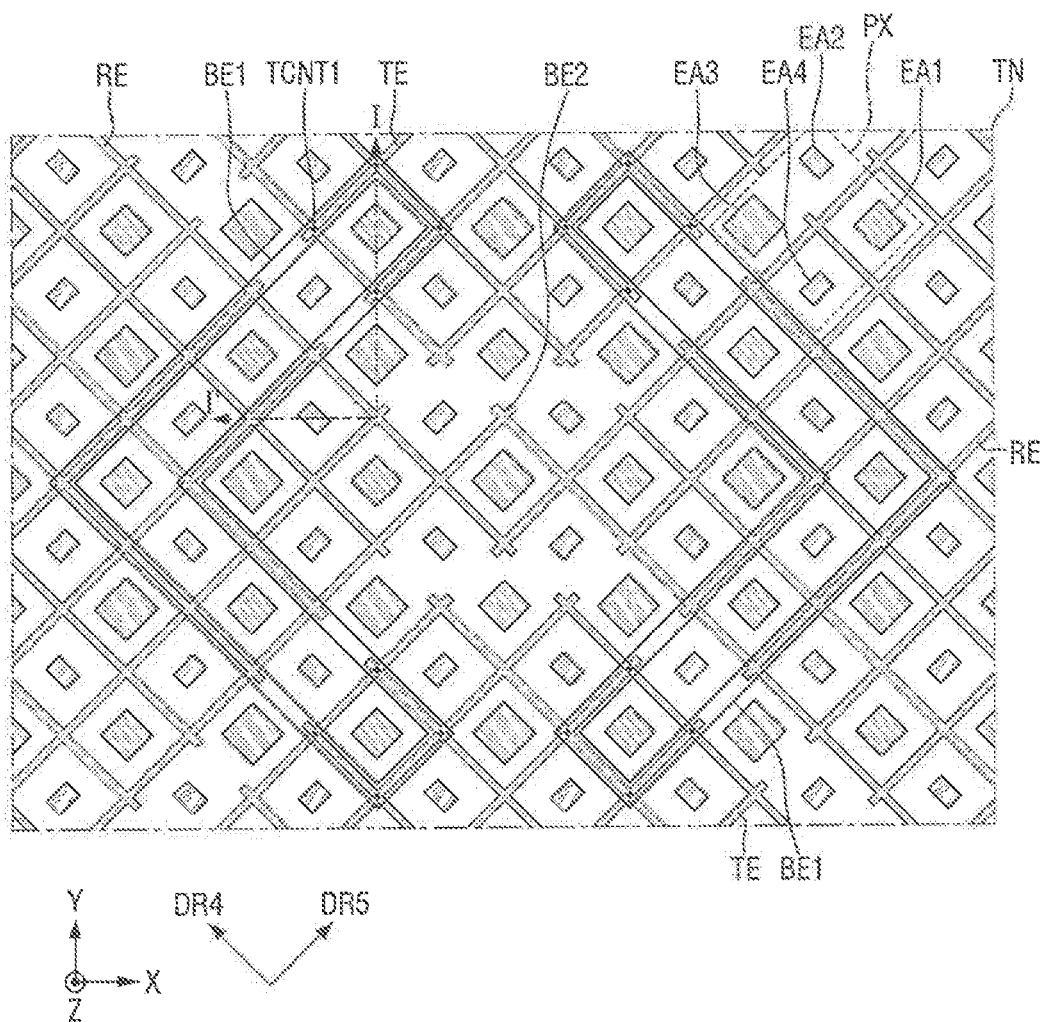
FIG. 5 is an enlarged layout view illustrating an example of a touch node of FIG. 4 in detail.

The driving electrode groups TG1 through TG14 may be electrically separated from each other. Each of the driving electrode groups TG1 through TG14 includes a plurality of driving electrodes TE electrically connected to each other in the second direction (Y-axis direction). The driving electrodes TE neighboring each other in the second direction (Y-axis direction) may be electrically connected to each other through a first connection part BE1 as illustrated in FIG. 5.

Each of the driving electrode groups TG1 through TG14 may be connected to a corresponding driving line on a lower side of the touch sensing area TSA. For example, the first driving electrode group TG1 may be connected to a first driving line TL1, the second driving electrode group TG2 may be connected to a second driving line TL2, the third driving electrode group TG3 may be connected to a third driving line TL3, and the fourth driving electrode group TG4 may be connected to a fourth driving line TL4. This connection scheme may be repeated, and the eleventh driving electrode group TG11 may be connected to an eleventh driving line TL11, the twelfth driving electrode group TG12 may be connected to a twelfth driving line TL12, the thirteenth driving electrode group TG13 may be connected to a thirteenth driving line TL13, and the fourteenth driving electrode group TG14 may be connected to a fourteenth driving line TL14.

In FIG. 4, fifth through tenth driving electrode groups and fifth through tenth driving lines are omitted for ease of description. In addition, although the touch sensing area TSA is illustrated as including fourteen driving electrode groups TG1 through TG14 and fourteen driving lines TL1 through TL14 in FIG. 4, the number of driving electrode groups TG1 through TG14 is not limited thereto.

The sensing electrode groups RG1 through RG40 may be disposed in the second direction (Y-axis direction). The sensing electrode groups RG1 through RG40 may be disposed from the lower side to an upper side of the touch sensing area TSA. For example, a first sensing electrode group RG1 may be disposed on a lowermost side of the touch sensing area TSA, and disposition of the sensing electrode groups may be repeated such that a fortieth sensing electrode group RG40 may be disposed on an uppermost side of the touch sensing area TSA.

The sensing electrode groups RG1 through RG40 may be electrically separated from each other. Each of the sensing electrode groups RG1 through RG40 includes a plurality of sensing electrodes RE electrically connected to each other in the first direction (X-axis direction). The sensing electrodes RE neighboring each other in the first direction (X-axis direction) may be connected to each other through a second connection part BE2 as illustrated in FIG. 5.

Each of first through twentieth sensing electrode groups RG1 through RG20 among the sensing electrode groups RG1 through RG40 may be connected to a corresponding sensing line on the right side of the touch sensing area TSA. For example, the first sensing electrode group RG1 may be connected to a first sensing line RL1, this connection scheme is repeated such that the twentieth sensing electrode group RG20 may be connected to a twentieth sensing line RL20.

Each of twenty-first through fortieth sensing electrode groups RG21 through RG40 among the sensing electrode groups RG1 through RG40 may be connected to a corresponding sensing line on the left side of the touch sensing area TSA. For example, the twenty-first sensing electrode group RG21 may be connected to a twenty-first sensing line RL21, and the fortieth sensing electrode group RG40 may be connected to a fortieth sensing line RL40.

In FIG. 4, the second through nineteenth sensing electrode groups, the twenty-first through thirty-ninth sensing electrode groups, the second through nineteenth sensing lines, and twenty-first through thirty-ninth sensing lines are omitted for ease of description. In addition, although the touch sensing area TSA is illustrated as including forty sensing electrode groups RG1 through RG40 and forty sensing lines RL1 through RL40 in FIG. 4, the number of sensing electrode groups RG1 through RG40 and the number of sensing lines RL1 through RL40 are not limited thereto.

Since the driving electrode groups TG1 through TG14 and the sensing electrode groups RG1 through RG40 are electrically separated, a touch node TN in which mutual capacitance is formed may be disposed at each of intersections of the driving electrode groups TG1 through TG14 and the sensing electrode groups RG1 through RG40. In this case, the mutual capacitance of each touch node TN may be charged by transmitting a touch driving signal to the driving electrode groups TG1 through TG14. In addition, the amount of change in the mutual capacitance of each touch node TN may be sensed through the sensing electrode groups RG1 through RG40.

Each of a plurality of dummy patterns DE may be surrounded by a driving electrode TE or a sensing electrode RE. Each of the dummy patterns DE may be electrically separated from the driving electrode TE or the sensing electrode RE. Each of the dummy patterns DE may be spaced apart from the driving electrode TE or the sensing electrode RE. Each of the dummy patterns DE may be electrically floating.

Although each of the driving electrodes TE, the sensing electrodes RE and the dummy patterns DE is illustrated as having a rhombic planar shape in FIG. 4, exemplary embodiments of the present disclosure are not limited thereto. For example, in some embodiments, each of the driving electrodes TE, the sensing electrodes RE, and the dummy patterns DE may also have a planar shape such as a quadrangle other than a rhombus, a polygon other than a quadrangle, a circle, or an ellipse.

The driving lines TL1 through TL14 may be disposed on the lower side of the touch sensing area TSA. Some of the sensing lines RL1 through RL40 may be disposed on the right side of the touch sensing area TSA, and the others may be disposed on the left side of the touch sensing area TSA. For example, the first through twentieth sensing lines RL1 through RL20 may be disposed on the right side of the touch sensing area TSA, and the twenty-first through fortieth sensing lines RL21 through RL40 may be disposed on the left side of the touch sensing area TSA. The first through twentieth sensing lines RL1 through RL20 may be defined as a first sensing line group, and the twenty-first through fortieth sensing lines RL21 through RL40 may be defined as a second sensing line group.

Each of the sensing lines RL1 through RL20 of the first sensing line group may be connected to a first side of a corresponding first sensing electrode group among first sensing electrode groups RG1 through RG20, and each of the sensing lines RL21 through RL40 of the second sensing line group may be connected to a second side of a corresponding second sensing electrode group among second sensing electrode groups RG21 through RG40. A length of any one of the first through twentieth sensing lines RL1 through RL20 of the first sensing line group may be smaller than a length of any one of the twenty-first through fortieth sensing lines RL21 through RL40 of the second sensing line group. A line minimum length of each of the first through twentieth sensing lines RL1 through RL20 may be smaller than a line minimum length of each of the twenty-first through fortieth sensing lines RL21 through RL40.

Although the number of sensing lines disposed on the right side of the touch sensing area TSA and the number of sensing lines disposed on the left side of the touch sensing area TSA are illustrated as being equal in FIG. 4, embodiments of the present disclosure are not limited thereto. For example, in some embodiments, the number of sensing lines disposed on the right side of the touch sensing area TSA and the number of sensing lines disposed on the left side of the touch sensing area TSA may be different. For example, in some embodiments, the number of sensing lines disposed on the right side of the touch sensing area TSA may be greater than the number of sensing lines disposed on the left side of the touch sensing area TSA.

Each of the driving pads TP may be connected to a corresponding driving line. Each of the sensing pads RP may be connected to a corresponding sensing line. The driving pads TP and the sensing pads RP may be disposed in the sub area SBA. The driving pads TP and the sensing pads RP may be electrically connected to the display circuit board 300 through a conductive adhesive member such as, for example, an anisotropic conductive film.

FIG. 5 is an enlarged plan view illustrating an example of a touch node TN of FIG. 4 in detail.

Referring to FIG. 5, the touch node TN may be defined as an intersection of a driving electrode TE and a sensing electrode RE.

Since a plurality of driving electrodes TE and a plurality of sensing electrodes RE are disposed on the same layer, the plurality of driving electrodes TE and the plurality of sensing electrodes RE may be spaced apart from each other. That is, a gap may be formed between a driving electrode TE and a sensing electrode RE adjacent to each other.

In addition, a plurality of dummy patterns DE may also be disposed on the same layer as the driving electrodes TE and the sensing electrodes RE. That is, a gap may be formed between a driving electrode TE and a dummy pattern DE disposed adjacent to each other and between a sensing electrode RE and a dummy pattern DE disposed adjacent to each other.

A plurality of first connection parts BE1 may be disposed on a different layer from the driving electrodes TE and the sensing electrodes RE. The first connection parts BE1 may be bent at least once. Although each of the first connection parts BE1 is illustrated as being shaped like a bracket ("<" or ">") in the plan view of FIG. 5, the planar shape of each of the first connection parts BE1 is not limited thereto. Since the driving electrodes TE disposed adjacent to each other in the second direction (Y-axis direction) are connected by a plurality of first connection parts BE1, even if any one of the first connection parts BE1 is broken, the connection between the driving electrodes TE disposed adjacent to each other in the second direction (Y-axis direction) may be maintained. Although the driving electrodes TE disposed adjacent to each other are illustrated as being connected by two first connection parts BE1 in FIG. 5, the number of first connection parts BE1 is not limited thereto.

Each of the first connection parts BE1 may overlap driving electrodes TE, which are adjacent in the second direction (Y-axis direction), in a third direction (Z-axis direction), which is the thickness direction of the substrate SUB. Each of the first connection parts BE1 may overlap a sensing electrode RE in the third direction (X-axis direction). A side of each of the first connection parts BE1 may be connected to any one of the driving electrodes TE adjacent in the second direction (Y-axis direction) through touch contact holes TCNT1. The other side of each of the first connection parts BE1 may be connected to the other one of the driving electrodes TE adjacent in the second direction (Y-axis direction) through touch contact holes TCNT1.

Due to the first connection parts BE1, the driving electrodes TE and the sensing electrodes RE may be electrically separated at each of their intersections. Therefore, mutual capacitance may be formed at each of the intersections of the driving electrodes TE and the sensing electrodes RE.

Each of the driving electrodes TE, the sensing electrodes RE and the first connection parts BE1 may have a mesh structure or a net structure in a plan view. In addition, each of the dummy patterns DE may have a mesh structure or a net structure in a plan view. Therefore, in some embodiments, each of the driving electrodes TE, the sensing electrodes RE, the first connection parts BE1, and the dummy patterns DE do not overlap a plurality of emission parts EA1 through EA4 of each of a plurality of pixels PX. Accordingly, according to embodiments of the present disclosure, light emitted from the emission parts EA1 through EA4 may be prevented from being blocked by the driving electrodes TE, the sensing electrodes RE, the first connection parts BE1 and the dummy patterns DE, and thus being reduced in luminance.

Each of the pixels PX includes a first emission part EA1 which emits light of a first color, a second emission part EA2 which emits light of a second color, a third emission part EA3 which emits light of a third color, and a fourth emission part EA4 which emits light of the second color. For example, the first color may be red, the second color may be green, and the third color may be blue.

The first emission part EA1 and the second emission part EA2 of each of the pixels PX may neighbor each other in a fourth direction DR4, and the third emission part EA3 and the fourth emission part EA4 may neighbor each other in the fourth direction DR4. The first emission part EA1 and the fourth emission part EA4 of each of the pixels PX may neighbor each other in a fifth direction DR5, and the second emission part EA2 and the third emission part EA3 may neighbor each other in the fifth direction DR5.

Each of the first emission part EA1, the second emission part EA2, the third emission part EA3, and the fourth emission part EA4 may have a rhombic or rectangular planar shape. However, embodiments of the present disclosure are not limited thereto. For example, in some embodiments, each of the first emission part EA1, the second emission part EA2, the third emission part EA3 and the fourth emission part EA4 may also have a planar shape such as a polygon other than a quadrangle, a circle, or an ellipse. In addition, although it is illustrated in FIG. 5 that among the emission parts, the area of the third emission part EA3 is the largest, and the area of each of the second emission part EA2 and the fourth emission part EA4 is the smallest, embodiments of the present disclosure are not limited thereto.

The second emission parts EA2 and the fourth emission parts EA4 may be disposed in odd rows. The second emission parts EA2 and the fourth emission parts EA4 may be disposed side by side in the first direction (X-axis direction) in each of the odd rows. The second emission parts EA2 and the fourth emission parts EA4 may be alternately arranged in each of the odd rows. Each of the second emission parts EA2 may have long sides in the fourth direction DR4 and short sides in the fifth direction DR5, whereas each of the fourth emission parts EA4 may have short sides in the fourth direction DR4 and long sides in the fifth direction DR5. The fourth direction DR4 is a direction between the first direction (X-axis direction) and the second direction (Y-axis direction) and may be a direction inclined at an angle of about 45 degrees to the first direction (X-axis direction). The fifth direction DR5 may be a direction orthogonal to the fourth direction DR4.

The first emission parts EA1 and the third emission parts EA3 may be disposed in even rows. The first emission parts EA1 and the third emission parts EA3 may be disposed side by side in the first direction (X-axis direction) in each of the even rows. The first emission parts EA1 and the third emission parts EA3 may be alternately arranged in each of the even rows.

The second emission parts EA2 and the fourth emission parts EA4 may be disposed in odd columns. The second emission parts EA2 and the fourth emission parts EA4 may be disposed side by side in the second direction (Y-axis direction) in each of the odd columns. The second emission parts EA2 and the fourth emission parts EA4 may be alternately disposed in each of the odd columns.

The first emission parts EA1 and the third emission parts EA3 may be disposed in even columns. The first emission parts EA1 and the third emission parts EA3 may be disposed side by side in the second direction (Y-axis direction) in each of the even columns. The first emission parts EA1 and the third emission parts EA3 may be alternately disposed in each of the even columns.

Figure 6:
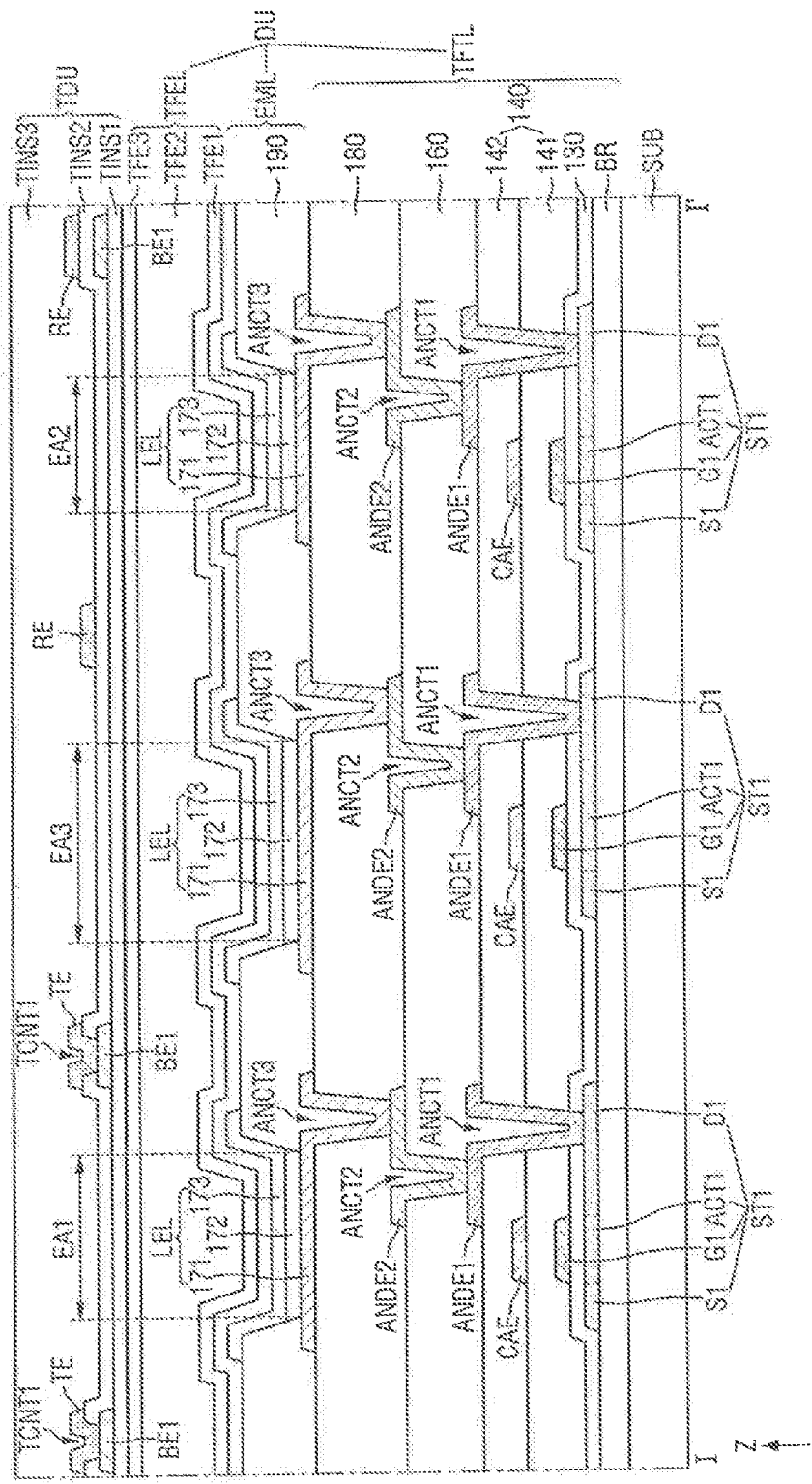
FIG. 6 is a cross-sectional view of an example of a display panel taken along line I-I' of FIG. 5.

FIG. 6 is a cross-sectional view of an example of the display panel 100 taken along line I-I' of FIG. 5.

Referring to FIG. 6, a barrier layer BR may be disposed on the substrate SUB. The substrate SUB may be made of an insulating material such as polymer resin. For example, the substrate SUB may be made of polyimide. The substrate SUB may be a flexible substrate that can be bent, folded, rolled, etc.

The barrier layer BR is a layer that may protect transistors of the thin-film transistor layer TFTL and light emitting layers 172 of the light emitting element layer EML from moisture introduced through the substrate SUB, which may be vulnerable to moisture permeation. The barrier layer BR may be composed of a plurality of inorganic layers stacked alternately. For example, the barrier layer BR may be a multilayer in which one or more inorganic layers including, for example, a silicon nitride layer, a silicon oxynitride layer, a silicon oxide layer, a titanium oxide layer, or an aluminum oxide layer, are alternately stacked.

Thin-film transistors ST1 may be disposed on the barrier layer BR. Each of the thin-film transistors ST1 includes an active layer ACT1, a gate electrode G1, a source electrode S1, and a drain electrode D1.

The active layer ACT1, the source electrode S1, and the drain electrode D1 of each of the thin-film transistors ST1 may be disposed on the barrier layer BR. The active layer ACT1 of each of the thin-film transistors ST1 may include, for example, polycrystalline monocrystalline silicon, low-temperature, polycrystalline silicon, amorphous silicon, or an oxide semiconductor. The active layer ACT1 overlapped by the gate electrode G1 in the third direction (Z-axis direction), which is the thickness direction of the substrate SUB, may be defined as a channel region. The source electrode S1 and the drain electrode D1 may be regions that are not overlapped by the gate electrode G1 in the third direction (Z-axis direction) and may be formed to have conductivity by doping a silicon semiconductor or an oxide semiconductor with ions or impurities.

A gate insulating layer 130 may be disposed on the active layer ACT1, the source electrode S1 and the drain electrode D1 of each of the thin-film transistors ST1. The gate insulating layer 130 may be made of an inorganic layer such as, for example, a silicon nitride layer, a silicon oxynitride layer, a silicon oxide layer, a titanium oxide layer, or an aluminum oxide layer.

The gate electrode G1 of each of the thin-film transistors ST1 may be disposed on the gate insulating layer 130. The gate electrode G1 may overlap the active layer ACT1 in the third direction (Z-axis direction). The gate electrode G1 may be a single layer or a multilayer made of any one or more of, for example, molybdenum (Mo), aluminum (Al), chromium (Cr), gold (Au), titanium (Ti), nickel (Ni), neodymium (Ne), copper (Cu), and alloys of the same.

A first interlayer insulating film 141 may be disposed on the gate electrode G1 of each of the thin-film transistors ST1. The first interlayer insulating film 141 may be made of an inorganic layer such as, for example, a silicon nitride layer, a silicon oxynitride layer, a silicon oxide layer, a titanium oxide layer, or an aluminum oxide layer. The first interlayer insulating film 141 may be composed of a plurality of inorganic layers.

Capacitor electrodes CAE may be disposed on the first interlayer insulating film 141. A capacitor electrode CAE may overlap the gate electrode G1 of each of the thin-film transistors T1 in the third direction (X-axis direction). Since the first interlayer insulating film 141 has a predetermined dielectric constant, the capacitor electrode CAE, the gate electrode G1, and the first interlayer insulating film 141 disposed between the capacitor electrode CAE and the gate electrode G1 may form a capacitor. Each of the capacitor electrodes CAE may be a single layer or a multilayer made of any one or more of, for example, molybdenum (Mo), aluminum (Al), chromium (Cr), gold (Au), titanium (Ti), nickel (Ni), neodymium (Ne), copper (Cu), and alloys of the same.

A second interlayer insulating film 142 may be disposed on the capacitor electrodes CAE. The second interlayer insulating film 142 may be made of an inorganic layer such as, for example, a silicon nitride layer, a silicon oxynitride layer, a silicon oxide layer, a titanium oxide layer, or an aluminum oxide layer. The second interlayer insulating film 142 may be composed of a plurality of inorganic layers.

First anode connection electrodes ANDE1 may be disposed on the second interlayer insulating film 142. A first anode connection electrode ANDE1 may be connected to the drain electrode D1 of each of the thin-film transistors ST1 through a first connection contact hole ANCT1 penetrating the gate insulating layer 130, the first interlayer insulating film 141 and the second interlayer insulating film 142. Each of the first anode connection electrodes ANDE1 may be a single layer or a multilayer made of any one or more of, for example, molybdenum (Mo), aluminum (Al), chromium (Cr), gold (Au), titanium (Ti), nickel (Ni), neodymium (Nd), copper (Cu), and alloys of the same.

A first planarization layer 160 may be disposed on the first anode connection electrodes ANDE1 to planarize steps formed by the thin-film transistors ST1. The first planarization layer 160 may be made of an organic layer such as, for example, acryl resin, epoxy resin, phenolic resin, polyamide resin, or polyimide resin.

Second anode connection electrodes ANDE2 may be disposed on the first planarization layer 160. Each of the second anode connection electrodes ANDE2 may be connected to a first anode connection electrode ANDE1 through a second connection contact hole ANCT2 penetrating the first planarization layer 160. Each of the second anode connection electrodes ANDE2 may be a single layer or a multilayer made of any one or more of, for example, molybdenum (Mo), aluminum (Al), chromium (Cr), gold (Au), titanium (Ti), nickel (Ni), neodymium (Nd), copper (Cu), and alloys of the same.

A second planarization layer 180 may be disposed on the second anode connection electrodes ANDE2. The second planarization layer 180 may be made of an organic layer such as, for example, acryl resin, epoxy resin, phenolic resin, polyamide resin, or polyimide resin.

Light emitting elements LEL and a bank 190 may be disposed on the second planarization layer 180. Each of the light emitting elements LEL includes a pixel electrode 171, the light emitting layer 172, and a common electrode 173.

The pixel electrode 171 may be formed on the second planarization layer 180. The pixel electrode 171 may be connected to each of the second anode connection electrodes ANDE2 through a third connection contact hole ANCT3 penetrating the second planarization layer 180.

In a top emission structure in which light is emitted from the light emitting layer 172 toward the common electrode 173, the pixel electrode 171 may be made of a metal material having high reflectivity, such as, for example, a stacked structure (Ti/Al/Ti) of aluminum and titanium, a stacked structure (ITO/Al/ITO) of aluminum and indium tin oxide, an APC alloy, or a stacked structure (ITO/APC/ITO) of an APC alloy and indium tin oxide. The APC alloy is an alloy of silver (Ag), palladium (Pd), and copper (Cu).

The bank 190 may be formed on the second planarization layer 180 to separate the pixel electrodes 171 so as to define the first emission part EA1, the second emission part EA2, the third emission part EA3, and the fourth emission part EA4. The bank 190 may cover edges of the pixel electrodes 171. The bank 190 may be made of an organic layer such as, for example, acryl resin, epoxy resin, phenolic resin, polyamide resin, or polyimide resin.

Each of the first emission part EA1, the second emission part EA2, the third emission part EA3, and the fourth emission part EA4 is an area in which the pixel electrode 171, the light emitting layer 172 and the common electrode 173 are sequentially stacked so that holes from the pixel electrode 171 and electrons from the common electrode 173 combine together in the light emitting layer 172 to emit light.

The light emitting layer 172 may be disposed on the pixel electrode 171 and the bank 190. The light emitting layer 172 may include an organic material and may emit light of a predetermined color. For example, the light emitting layer 172 may include a hole transporting layer, an organic material layer, and an electron transporting layer.

The common electrode 173 may be disposed on the light emitting layer 172. The common electrode 173 may cover the light emitting layer 172. The common electrode 173 may be a common layer common to all of the first emission part EA1, the second emission part EA2, the third emission part EA3, and the fourth emission part EA4. A capping layer may be formed on the common electrode 173.

In the top emission structure, the common electrode 173 may be made of a transparent conductive oxide (TCO) capable of transmitting light, such as, for example, indium tin oxide (ITO) or indium zinc oxide (IZO), or a semi-transmissive conductive material such as, for example, magnesium (Mg), silver (Ag) or an alloy of Mg and Ag. When the common electrode 173 is made of a semi-transmissive conductive material, light output efficiency may be increased by a microcavity.

The encapsulation layer TFEL may be disposed on the common electrodes 173. The encapsulation layer TFEL includes at least one inorganic layer that may prevent oxygen or moisture from permeating into the light emitting element layer EML. In addition, the encapsulation layer TFEL includes at least one organic layer that may protect the light emitting element layer EML from foreign substances such as dust. For example, the encapsulation layer TFEL includes a first encapsulating inorganic layer TFE1, an encapsulating organic layer TFE2, and a second encapsulating inorganic layer TFE3.

The first encapsulating inorganic layer TFE1 may be disposed on the common electrodes 173, the encapsulating organic layer TFE2 may be disposed on the first encapsulating inorganic layer TFE1, and the second encapsulating inorganic layer TFE3 may be disposed on the encapsulating organic layer TFE2. Each of the first encapsulating inorganic layer TFE1 and the second encapsulating inorganic layer TFE3 may be a multilayer in which one or more inorganic layers selected from, for example, a silicon nitride layer, a silicon oxynitride layer, a silicon oxide layer, a titanium oxide layer, and an aluminum oxide layer are alternately stacked. The encapsulating organic layer TFE2 may be made of an organic layer such as, for example, acryl resin, epoxy resin, phenolic resin, polyamide resin, car polyimide resin.

The touch sensing unit TDU may be disposed on the encapsulation layer TFEL. The touch sensing unit TDU includes a first touch insulating layer TINS1, the first connection parts BE1, a second touch insulating layer TINS2, the driving electrodes TE, the sensing electrodes RE, and a third touch insulating layer TINS3.

The first touch insulating layer TINS1 may be made of an inorganic layer such as, for example, a silicon nitride layer, a silicon oxynitride layer, a silicon oxide layer, a titanium oxide layer, or an aluminum oxide layer.

The first connection parts BE1 may be disposed on the first touch insulating layer TINS1. Each of the first connection parts BE1 may be a single layer or a multilayer made of any one or more of, for example, molybdenum (Mo), aluminum (Al), chromium (Cr), gold (Au), titanium (Ti), nickel (Ni), neodymium (Ne), copper (Cu), and alloys of the same.

The second touch insulating layer TINS2 is disposed on the first connection parts BE1. The second touch insulating layer TINS2 may be made of an inorganic layer such as, for example, a silicon nitride layer, a silicon oxynitride layer, a silicon oxide layer, a titanium oxide layer, or an aluminum oxide layer. Alternatively, the second touch insulating layer TINS2 may be made of an organic layer such as, for example, acryl resin, epoxy resin, phenolic resin, polyamide resin, or polyimide resin.

The driving electrodes TE and the sensing electrodes RE may be disposed on the second touch insulating layer TINS2. In addition, not only the driving electrodes TE and the sensing electrodes RE, but also the dummy patterns DE, the driving lines TL1~TL14 and the sensing lines RL1~RL40 illustrated in FIG. 4 may be disposed on the second touch insulating layer TINS2. Each of the driving electrodes TE and the sensing electrodes RE may be a single layer or a multilayer made of any one or more of, for example, molybdenum (Mo), aluminum (Al), chromium (Cr), gold (Au), titanium (Ti), nickel (Ni), neodymium (Ne), copper (Cu), and alloys of the same.

The driving electrodes TE and the sensing electrodes RE may overlap the first connection parts BE1 in the third direction (Z-axis direction). The driving electrodes TE may be connected to the first connection parts BE1 through the touch contact holes TCNT1 penetrating the first touch insulating layer TINS1.

The third touch insulating layer TINS3 is formed on the driving electrodes TE and the sensing electrodes RE. The third touch insulating layer TINS3 may planarize steps formed by the driving electrodes TE, the sensing electrodes RE, and the first connection parts BE1. The third touch insulating layer TINS3 may be made of an organic layer such as, for example, acryl resin, epoxy resin, phenolic resin, polyamide resin, or polyimide resin.

Figure 7:
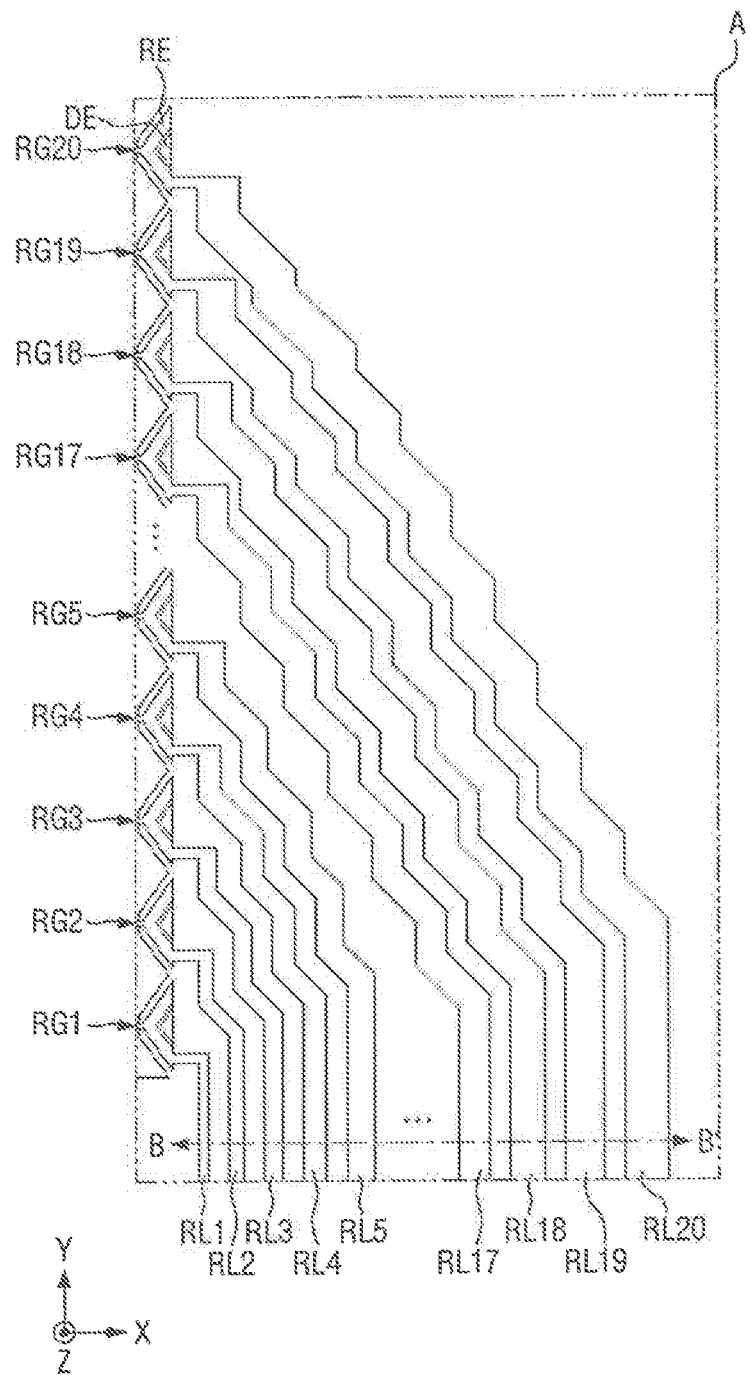
FIG. 7 is an enlarged layout view illustrating an example of area A of FIG. 4 in detail.
Figure 8:
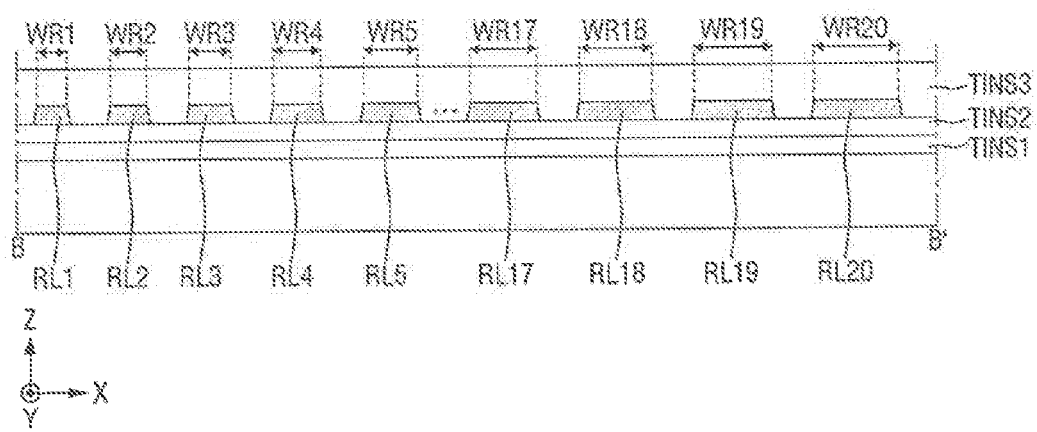
FIG. 8 is a cross-sectional view, of an example of a touch sensing unit taken along line B-B' of FIG. 7'.

FIG. 7 is an enlarged layout view illustrating an example of area A of FIG. 4 in detail. FIG. 8 is a cross-sectional view of an example of the touch sensing unit TDU taken along line B-B' of FIG. 7.

Referring to FIGS. 7 and 8, a sensing electrode RE disposed on the right side in each of the first through fifth sensing electrode groups RG1 through RG5 and the seventeenth through twentieth sensing electrode groups RG17 through RG20 may be connected to a corresponding sensing line. For example, a sensing electrode RE disposed on the right side of the first sensing electrode group RG1 may be connected to the first sensing line RL1, a sensing electrode RE disposed on the right side of the second sensing electrode group RG2 may be connected to the second sensing RL2, a sensing electrode RE disposed on the right side of the third sensing electrode group RG3 may be connected to the third sensing line RL3, a sensing electrode RE disposed on the right side of the fourth sensing electrode group RG4 may be connected to the fourth sensing line RL4, and a sensing electrode RE disposed on the right side of the fifth sensing electrode group RG5 may be connected to the fifth sensing line RL5. In addition, a sensing electrode RE disposed on the right side of the seventeenth sensing electrode group RG17 may be connected to the seventeenth sensing line RL17, a sensing electrode RE disposed on the right side of the eighteenth sensing electrode group RG18 may be connected to the eighteenth sensing line RL18, a sensing electrode RE disposed on the right side of the nineteenth sensing electrode group RG19 may be connected to the nineteenth sensing line RL19, and a sensing electrode RE disposed on the right side of the twentieth sensing electrode group RG20 may be connected to the twentieth sensing line RL20.

The first through twentieth sensing lines RL1 through RL20 may have different widths. For example, the widths of the first through twentieth sensing lines RL1 through RL20 may increase from the first sensing line RL1 toward the twentieth sensing line RL20. That is, the widths of the first through twentieth sensing lines RL1 through RL20 may be proportional to the line length.

For example, since a length of the first sensing line RL1 is the shortest, a width WR1 of the first sensing line RL1 may be the smallest. In addition, since a length of the twentieth sensing line RL20 is the largest, a width WR20 of the twentieth sensing line RL20 may be the largest. For example, as shown in FIG. 8, a width WR2 of the second sensing line RL2 may be greater than the width WR1 of the first sensing line RL1, is width WR3 of the third sensing line RL3 may be greater than the width WR2 of the second sensing line RL2, a width WR4 of the fourth sensing line may be greater than the width WR3 of the third sensing line RL3, and a width WR5 of the fifth sensing line RL5 may be greater than the width. WR4 of the fourth sensing line RL4. This relationship may continue for the remaining sensing lines. For example, a width WR18 of the eighteenth sensing line RL18 may be greater than a width WR17 of the seventeenth sensing line RL17, a width WR19 of the nineteenth sensing line RL19 may be greater than the width WR18 of the eighteenth sensing line RL18, and the width WR20 of the twentieth sensing line RL20 may be greater than the width WR19 of the nineteenth sensing line RL19.

As illustrated in FIGS. 7 and 8, when the first through twentieth sensing lines RL1 through RL20 are designed in a differential line width extension manner in which the widths of the first through twentieth sensing lines RL1 through RL20 are proportional to the line length, resistances of the first through twentieth sensing lines RL1 through RL20 may be designed uniformly.

Figure 9:
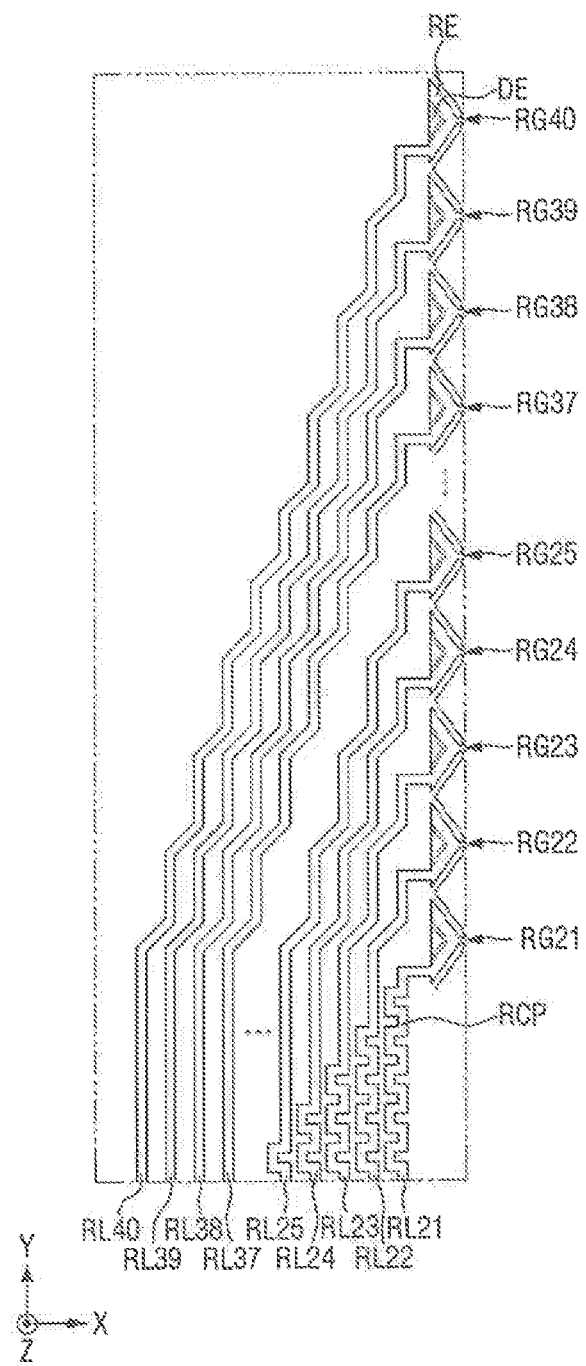
FIG. 9 is an enlarged layout view illustrating an example of area B of FIG. 4 in detail.

FIG. 9 is an enlarged layout view illustrating an example of area B of FIG. 4 in detail.

Referring to FIG. 9, a sensing electrode RE disposed on the left side in each of the twenty-first through twenty-fifth sensing electrode groups RG21 through RG25 and the thirty-seventh through fortieth sensing electrode groups RG37 through RG40 may be connected to a corresponding sensing line. For example, a sensing electrode RE disposed on the left side of the twenty-first sensing electrode group RG21 may be connected to the twenty-first sensing line RL21, a sensing electrode RE disposed on the left side of the twenty-second sensing electrode group RG22 may be connected to the twenty-second sensing line RL22, a sensing electrode RE disposed on the left side of the twenty-third sensing electrode group RG23 may be connected to the twenty-third sensing line RL23, a sensing electrode RE disposed on the twenty-fourth sensing electrode group RG24 may be connected to the twenty-fourth sensing line RL24, and a sensing electrode RE disposed on. the left side of the twenty-fifth sensing electrode group RL25 may be connected to the twenty-fifth sensing line RL25. In addition, a sensing electrode RE disposed on the left side of the thirty-seventh sensing electrode group RG37 may be connected to the thirty-seventh sensing line RL37, a sensing electrode RE disposed on the thirty-eighth sensing electrode group RG38 may be connected to the thirty-eighth sensing line RL38, a sensing electrode RE disposed on the left side of the thirty-ninth sensing electrode group RG39 may be connected to the thirty-ninth sensing line RL39, and a sensing electrode RE disposed on the left side of the fortieth sensing electrode group RG40 may be connected to the fortieth sensing line RL40.

Some of the twenty-first through fortieth sensing lines RL21 through RL40 may include a resistance compensation pattern RCP. For example, the twenty-first through twenty-fifth sensing lines RL21 through RL25 may include the resistance compensation pattern RCP. The resistance compensation patterns RCP may be a winding pattern.

A length of the resistance compensation pattern RCP may be inversely proportional to the length of a sensing line RL excluding the resistance compensation pattern RCP.

When the resistance compensation pattern RCP is excluded, the length of the twenty-first. sensing line RL21 is the shortest among the twenty-first through twenty-fifth sensing lines RL21 through RL25, and the length of the twenty-fifth sensing line RL25 is the longest. Therefore, the length of the resistance compensation pattern RCP may decrease from the twenty-first sensing line RL21 toward the twenty-fifth sensing line RL25.

As illustrated in FIG. 9, due to the resistance compensation pattern RCP, the twenty-first through fortieth sensing lines RL21 through RL40 may have similar lengths. Therefore, the resistances of the twenty-first through fortieth sensing lines RL21 through RL40 may be designed uniformly.

Although only the twenty-first through twenty-fifth sensing lines RL21 through RL25 are illustrated in FIG. 9 as including the resistance compensation pattern RCP for ease of description, embodiments of the present disclosure are not limited thereto.

Figure 10:
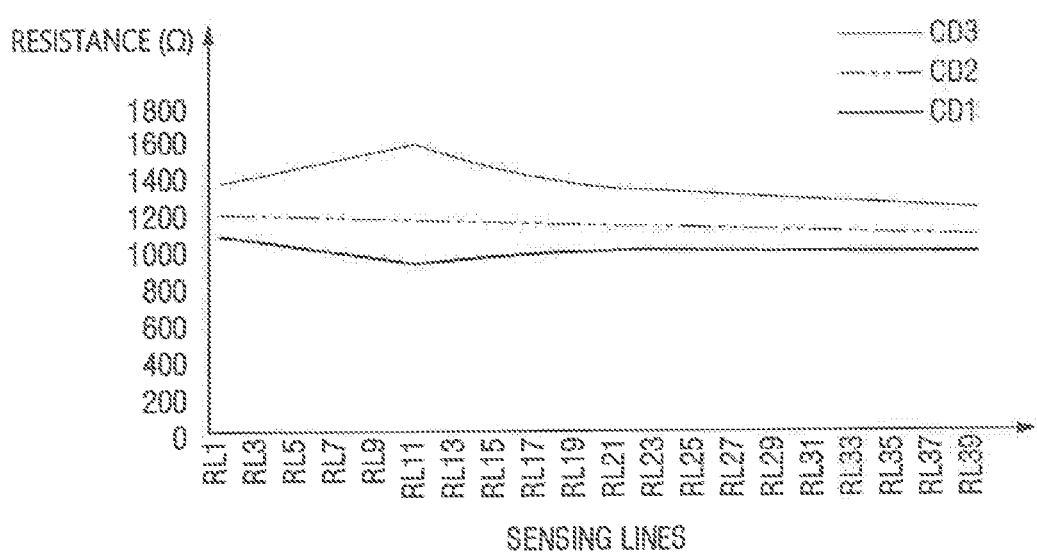
FIG. 10 is a graph illustrating example resistances of a plurality of sensing lines according to a process error.

FIG. 10 is a graph illustrating example resistances of a plurality of sensing lines according to a process error, FIG. 10 illustrates the resistances of the sensing lines according to the process error in a case in which the first through twentieth sensing lines RL1 through RL20 are designed in a differential line width extension manner as illustrated FIGS. 7 and 8 and in which the resistance compensation pattern RCP is applied to the twenty-first through fortieth sensing lines RL21 through RL40 as illustrated in FIG. 9.

In FIG. 10, the X axis represents the sensing line, and the Y axis represents resistance (Ω). In FIG. 10, "CD1" indicates that the width of the sensing line has a process error of about 0.2 µm indicates that the width of the sensing line has a process error of about 1 µm, and "CD3" indicates that the width of the sensing line has a process error of about 1.8 µm. For example, "CD1" is a case in which when the width of the sensing line formed without a process error is about 4 µm, the sensing line is formed to have a width of about 3.8 µm due to the process error. In addition, "CD2" is a case in which when the width e sensing line formed without a process error is about 4 µm, the sensing line is formed to have a width of about 3 µm due to the process error. In addition, "CD3" is a case in width when the width of the sensing Zine formed without a process error is about 4 µm, the sensing line is formed to have a width of about 2.2 µm due to the process error.

Referring to FIG. 10, an increase and decrease in the resistances of the sensing lines varies according to a process error. That is, the trend of a resistance slope of the sensing lines varies according to the process error.

For example, in the case of "CD1," resistances of the first through eleventh sensing lines RL1 through RL11 may decrease, but resistances of the twelfth through fortieth sensing lines RL12 through RL40 may increase. That is, in the case of "CD1," a resistance slope of the first through eleventh sensing lines RL1 through RL11 may have a negative value, but a resistance slope of the twelfth through fortieth sensing lines RL12 through RL40 may have a positive value.

In the case of "CD2," the resistances of the first through fortieth sensing lines RL1 through RL40 may decrease gently. That is, in the case of "CD2," a resistance slope of the first through fortieth sensing lines RL1 through RL40 may have a negative value.

In the case of "CD3," the resistances of the first through eleventh sensing lines RL1 through RL11 may increase, but the resistances of the twelfth through fortieth sensing lines RL12 through RL40 may decrease, That is, in the case of "CD3," the resistance slope of the first through eleventh sensing lines RL1 through RL11 may have a positive value, but the resistance slope of the twelfth through fortieth sensing lines RL12 through RL40 may have a negative value.

As illustrated in FIG. 10, when the trend of a resistance slope of a plurality of sensing lines varies according to a process error, the amount of change in mutual capacitance of each of the touch nodes sensed through the sensing lines may vary according to the process error. In this case, the sensing capability of the touch sensing unit TDU may be reduced according to temperature and noise characteristics. Therefore, according to embodiments of the present disclosure, the trend of the resistance slope of the sensing lines may be uniformly designed regardless of the process error. This will be described in detail below with reference to FIGS. 11 through 17.

Figure 11:
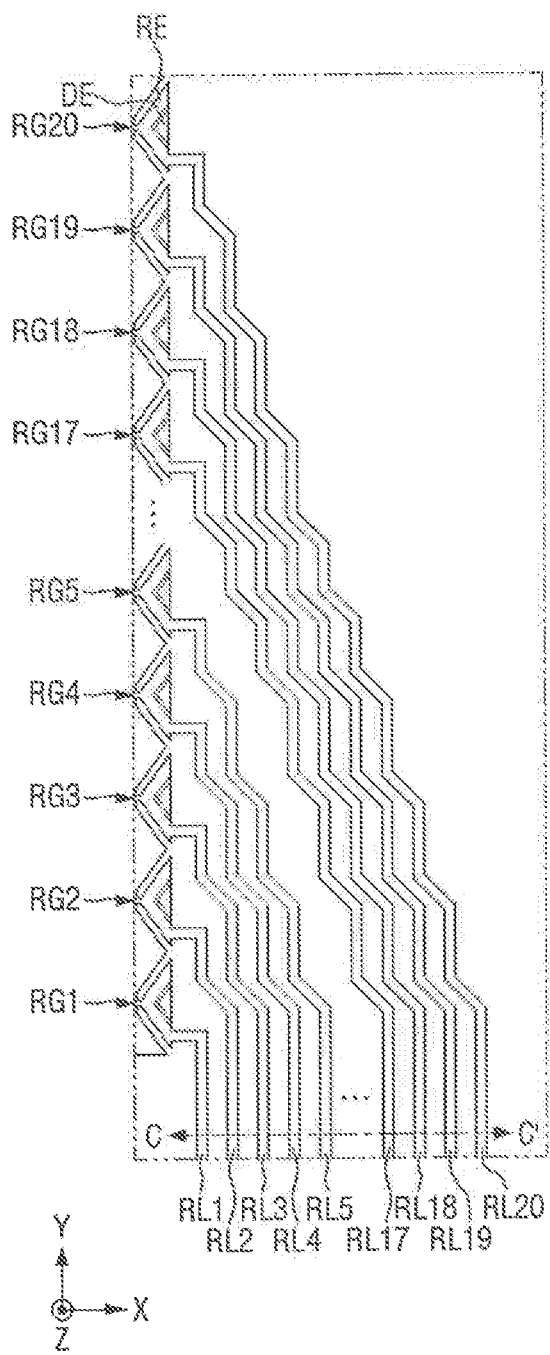
FIG. 11 is an enlarged layout view illustrating an example of area A of FIG. 4 in detail.
Figure 12:
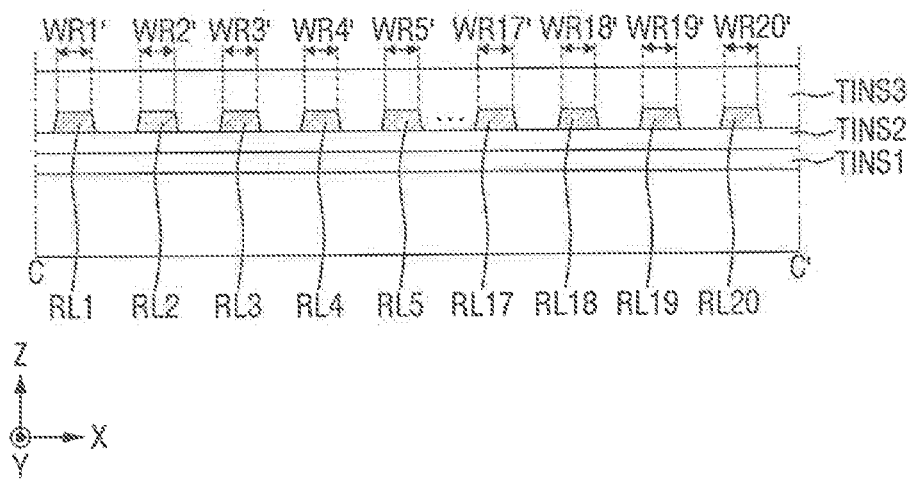
FIG. 12 is a cross-sectional view of an example of a touch sensing unit taken along line C-C' of FIG. 11.

FIG. 11 is an enlarged layout view illustrating an example of area A of FIG. 4 in detail. FIG. 12 is a cross-sectional view of an example of the touch sensing unit TDU taken along line C-C' of FIG. 11.

The embodiment of FIGS. 11 and 12 is different from the embodiment of FIGS. 7 and 8 in that first through twentieth sensing lines RL1 through RL20 have substantially the same width. In FIGS. 11 and 12, differences from the embodiment of FIGS. 7 and 8 will be mainly described, and a further description of some components and technical aspects previously described will be omitted.

Referring to FIGS. 11 and 12, a width WR1' of the first sensing line RL1, a width WR2' of the second sensing line RL2, a width WR3' of the third sensing line RL3, a width WR4' of the fourth sensing line RL4, a width WR5' of the fifth sensing line RL5, a width WR17' of the seventeenth sensing line RL17, a width WR18' of the eighteenth sensing line. RL18, a width WR19' of the nineteenth sensing line RL19, and a width WR20' of the twentieth sensing line RL20 may be substantially equal to each other.

Figure 13:
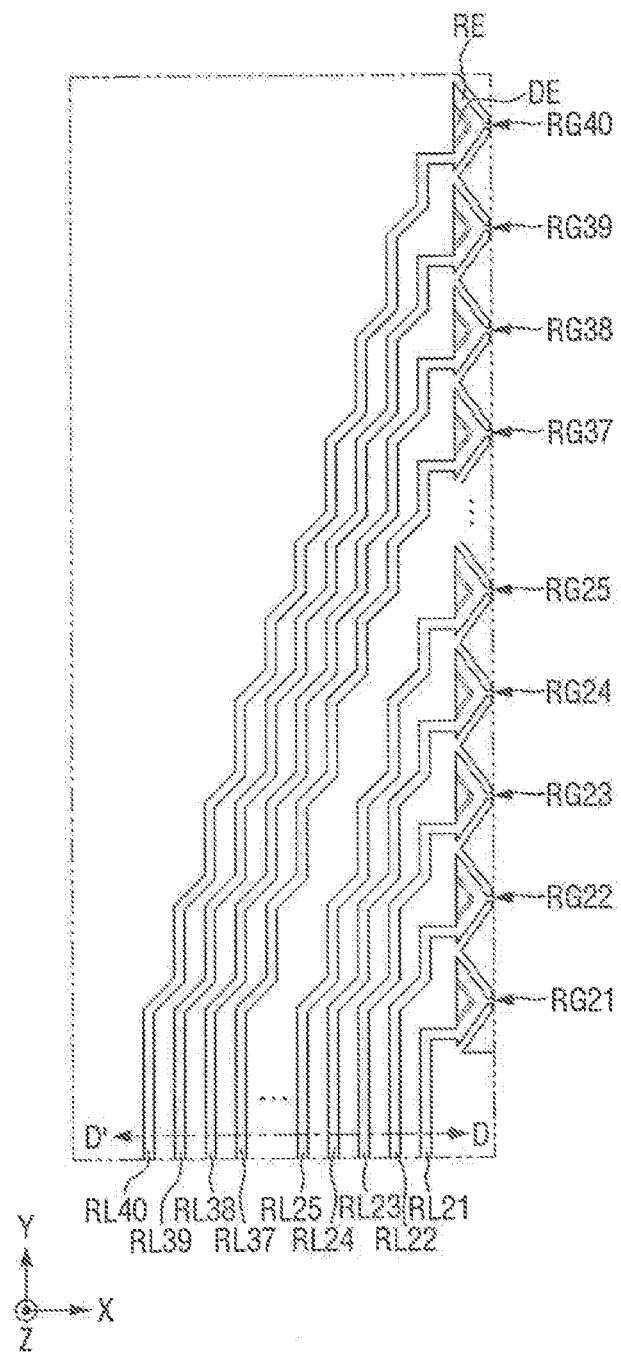
FIG. 13 is an enlarged layout view illustrating an example of area B of FIG. 4 in detail.
Figure 14:
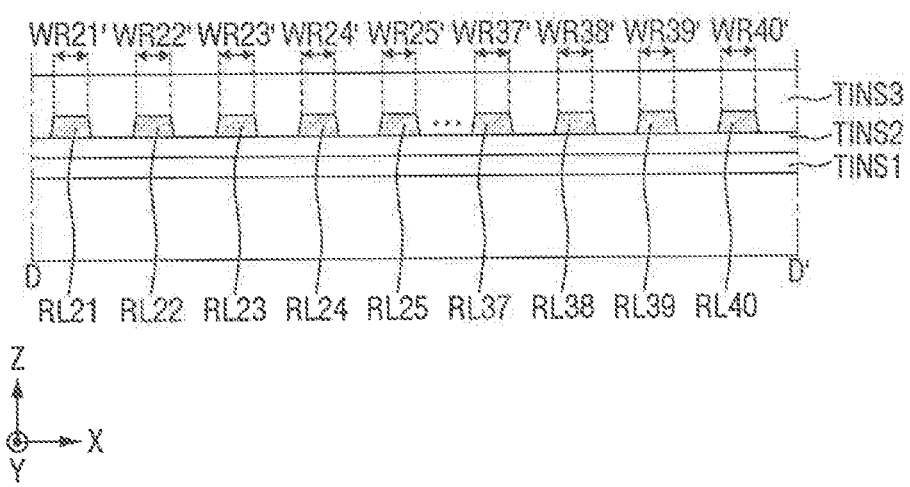
FIG. 14 is a cross-sectional view of an example of a touch sensing unit taken along line D-D' of FIG. 13.

FIG. 13 is an enlarged layout view illustrating an example of area B of FIG. 4 in detail. FIG. 14 is a cross-sectional view of an example of the touch sensing unit TDU taken along line D-D' of FIG. 13.

The embodiment of FIGS. 13 and 14 is different from the embodiment of FIG. 9 in that twenty-first through fortieth sensing lines RL21 through RL40 have substantially the same width and do not include a resistance compensation pattern RCP. In FIGS. 13 and 14, differences from the embodiment of FIG. 9 will be mainly described, and a further description of some components and technical aspects previously described will be omitted.

Referring to FIGS. 13 and 14, a width WR21' of the twenty-first sensing line RL21, a width WR22' of the twenty-second sensing line RL22, a width WR23' of the twenty-third sensing line RL23, a width WR24' of the twenty-fourth sensing line RL24, a width WR25' of the twenty-fifth sensing line RL25, a width WR37' of the thirty-seventh sensing line RL37, a width WR38' of the thirty-eighth sensing line RL38, a width WR39' of the thirty-ninth sensing line RL39, and a width WR40' of the fortieth sensing line RL40 may be substantially equal to each other.

In addition, widths of first through twentieth sensing lines RL1 through RL20 may be substantially equal to the widths of the twenty-first through fortieth sensing lines RL21 through RL40. That is, the first through twentieth sensing lines RU through RL20 and the twenty-first through fortieth sensing lines RL21 through RL40 may have substantially the same width. For example, a width WR1' of the first sensing line RL1, a width WR2' of the second sensing line RL2, a width WR3' of the third sensing line RL3, a width WR4' of the fourth sensing line RL4, a width WR5' of the fifth sensing line RL5, a width WR17' of the seventeenth sensing line RL17, a width WR18' of the eighteenth sensing line RL18, a width WR19' of the nineteenth sensing line RL19, a width WR20' of the twentieth sensing line RL20, the width WR21' of the twenty-first sensing line RL21, the width WR22' of the twenty-second sensing line RL22, the width WR23' of the twenty-third sensing line RL23, the width WR24' of the twenty-fourth sensing line RL24, the width WR25' of the twenty-fifth sensing line RL25, the width WR37' of the thirty-seventh sensing line RL37, the width WR38' of the thirty-eighth sensing line RL38, the width WR39' of the thirty-ninth sensing line RL39, and the width WR40' of the fortieth sensing line RL40 may be substantially equal to each other.

As illustrated in FIGS. 11 through 14, when the widths of the first through twentieth sensing lines RL1 through RL20 are substantially equal to the widths of the twenty-first through fortieth sensing lines RL21 through RL40, a width of a touch peripheral area TPA disposed on the left side of a touch sensing area TSA and the width of the touch peripheral area TPA disposed on the right side of the touch sensing area. TSA may be reduced.

Figure 15:
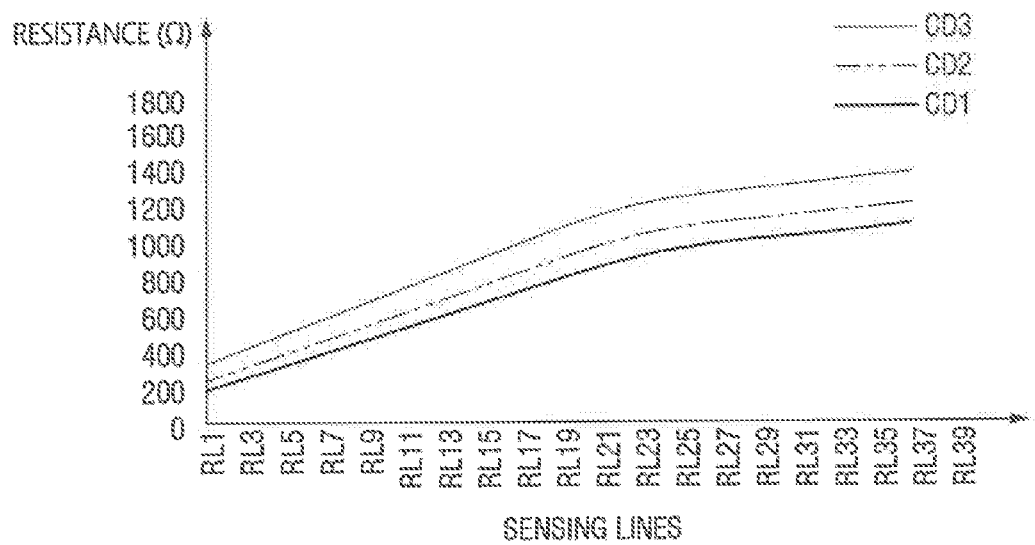
FIG. 15 is a graph illustrating example resistances of a plurality of sensing lines according to a process error.

FIG. 15 is a graph illustrating example resistances of a plurality of sensing lines according to a process error. FIG. 15 illustrates the resistances of the sensing lines according to the process error in a case in which the first through fortieth sensing liners RL1 through RL40 have substantially the same width as illustrated in FIGS. 11 through 14.

In FIG. 15, the X axis represents the sensing line, and the Y axis represents resistance (Ω). In FIG. 15, "CD1" indicates that the width of the sensing line has a process error of about 0.2 μm, "CD2" indicates that the width of the sensing line has a process error of about 1 μm, and "CD3" indicates that the width of the sensing line has a process error of about 1.8 μm. Tor example, "CD1" is a case in which when the width of the sensing line formed without a process error is about 4 μm, the sensing line is formed to have a width of about 3.8 μm due to the process error. In addition, "CD2" is a case in which when the width of the sensing line formed without a process error is about 4 μm, the sensing line is fa Led to have a width of about 3 μm due to the process error. In addition, "CD3" is a case in which when the width of the sensing line formed without a process error is about 4 μm, the sensing line is formed to have a width of about 2.2 μm due to the process error.

Referring to FIG. 15, an increase and decrease in the resistances of the sensing lines may be uniform regardless of a process error. That is, the trend of a resistance slope of the sensing lines tray be uniform regardless of the process error.

For example, in each of "CD1," "CD2," and "CD3," resistances of the first through fortieth sensing lines RL1 through RL40 may increase. Here, a resistance slope of the first through twentieth sensing lines RL1 through RL20 may be greater than a resistance slope of the twenty-first through fortieth sensing lines RL1 through RL40. In addition, the resistance slope of the first through twentieth sensing lines RL1 through RL20 may be constant, but the resistance slope of the twenty-first through fortieth sensing lines RL21 through RL40 may be variable. For example, the resistance slope of the twenty-first through fortieth sensing lines RL21 through RL40 may decrease gradually.

As illustrated in FIG. 15, the trend of a resistance slope of a plurality of sensing lines may be uniform regardless of a process error. Therefore, a difference in the amount of change in mutual capacitance of each of the touch nodes sensed through the sensing lines may be insignificant even if there is a process error. In this case, a reduction in the sensing capability of the touch sensing unit TDU according to temperature and noise characteristics may be insignificant, Therefore, embodiments of the present disclosure may prevent or reduce a reduction in the sensing quality of the touch sensing unit TDU.

Figure 16:
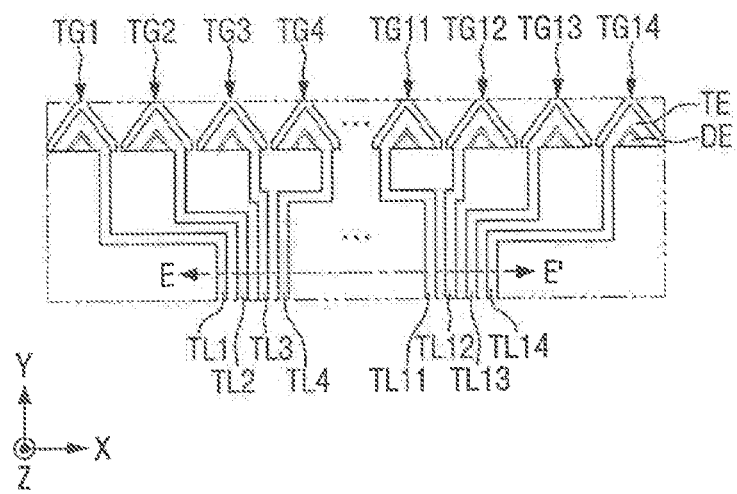
FIG. 16 is an enlarged layout view illustrating an example of area C of FIG. 4 in detail.
Figure 17:
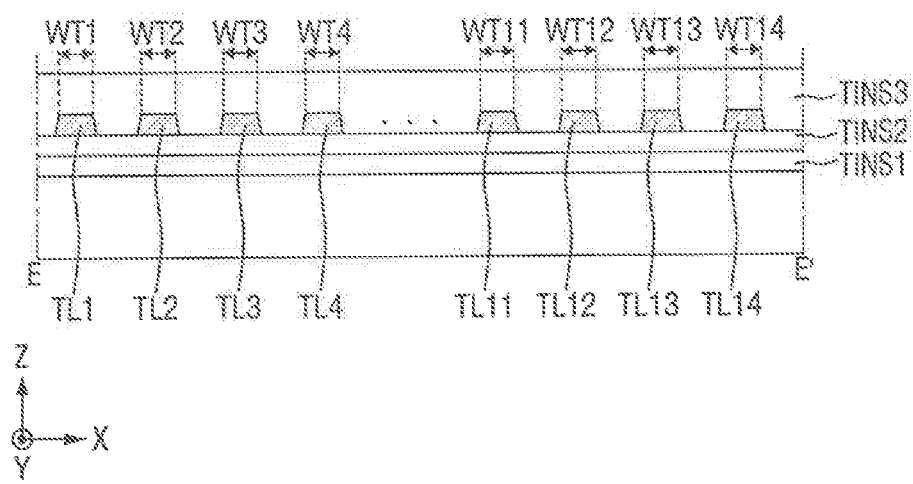
FIG. 17 is a cross-sectional view of an example of a touch sensing unit taken along line E-E' of FIG. 16.

FIG. 16 is an enlarged layout view illustrating an example of area C of FIG. 4 in detail. FIG. 17 is a cross-sectional view of an example of the touch sensing unit TDU taken along line E-E' of FIG. 16.

Referring to FIGS. 16 and 17, a driving electrode TE disposed on the lower side in each of the first through fourth driving electrode groups TG1 through TG4 and the eleventh through fourteenth driving electrode groups TG11 through TG14 may be connected to a corresponding driving line. For example, a driving electrode TE disposed on the lower side of the first driving electrode group TG1 may be connected to the first driving line TL1, a driving electrode TE disposed on the lower side of the second driving electrode group TG2 may be connected to the second driving line TL2, a driving electrode TE disposed on the lower side of the third driving electrode group TG3 may be connected to the third driving line TL3, and a driving electrode TE disposed on the lower side of the fourth driving electrode group TG4 may be connected to the fourth driving line TL4. In addition, a driving electrode TE disposed on the lower side of the eleventh driving electrode group TG11 may be connected to the eleventh driving line TL11, a driving electrode TE disposed on the lower side of the twelfth driving electrode group TG12 may be connected to the twelfth driving line TL12, a driving electrode TE disposed on the lower side of the thirteenth driving electrode group TG13 may be connected to the thirteenth driving line TL13, and a driving electrode TE disposed on the lower side of the fourteenth driving electrode group TG14 may be connected to the fourteenth driving line TL14.

The first through fourteenth driving lines TL1 through TL14 may have substantially the same width. For example, as shown in FIG. 17, a width WT1 of the first driving line TL1, a width WT2 of the second driving line TL2, a width WT3 of the third driving line TL3, a width WT4 of the fourth driving line TL4, a width WT11 of the eleventh driving line TL11, a width WT12 of the twelfth driving line TL12, a width WT13 of the thirteenth driving line TL13, and a width WT14 of the fourteenth driving line TL14 may be substantially equal.

In this case, the width of each of the first through fourteenth driving lines TL1 through TL14 may be greater than the width of each of the first through twentieth sensing lines RL1 through RL20 illustrated in FIG. 14. In addition, the width of each of the first through fourteenth driving lines TL1 through TL14 may be greater than the width of each of the twenty-first through fortieth sensing lines RL21 through RL40 illustrated in FIGS. 11 through 14.

Figure 18:
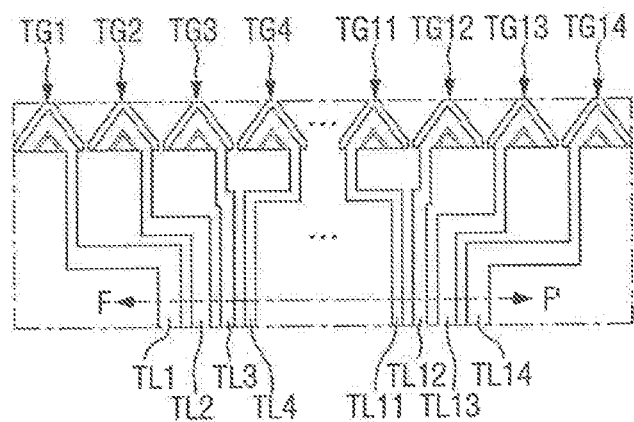
FIG. 18 is an enlarged layout view illustrating an example of area C of FIG. 4 in detail.
Figure 19:
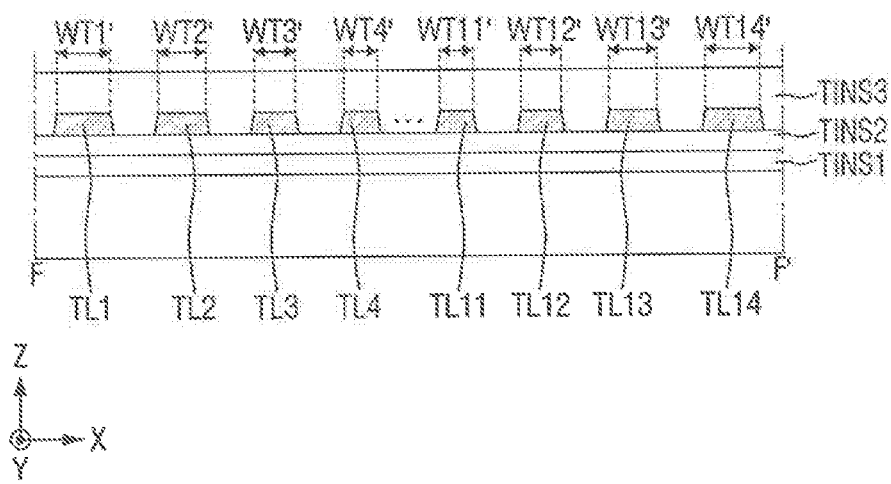
FIG. 19 is a cross-sectional view of an example of a touch sensing unit taken along line F-F' of FIG. 18.

FIG. 18 is an enlarged layout view illustrating an example of area C of FIG. 4 in detail. FIG. 19 is a cross-sectional view of an example of the touch sensing unit TDU taken along line F-F' of FIG. 18.

The embodiment of FIGS. 18 and 19 is different from the embodiment of FIGS. 16 and 17 in that first through fourth driving lines TL1 through TL4 have different widths, and eleventh through fourteenth driving lines TL11 through TL14 have different widths. In FIGS. 18 and 19, differences from the embodiment of FIGS. 16 and 17 will be mainly described, and a further description of some components and technical aspects previously described will be omitted.

Referring to FIGS. 18 and 19, the widths of the first through fourth driving lines TL1 through TL4 may decrease from the first driving line TL1 toward the fourth driving line TL4. That is, the widths of the first through fourth driving lines TL1 through TL4 may be proportional to the line length.

For example, since a length of the first driving line TL1 is the longest among the first through fourth driving lines TL1 through TL4, a width WT1' of the first driving line TL1 may be the largest. Since a length of the fourth driving line TL4 is the shortest among the first through fourth driving lines TL1 through TL4, a width WT4' of the fourth driving line TL4 may be the smallest. The width WT1' of the first driving line TL1 may be greater than a width WT2' of the second driving line TL2, the width WT2' of the second driving line TL2 may be greater than a width WT3' of the third driving line TL3, and the width WT3' of the third driving line TL3 may be greater than the width WT4' of the fourth driving line TL4.

The widths of the eleventh through fourteenth driving lines TL11 through TL14 may increase from the eleventh driving line TL11 toward the fourteenth driving line TL14.

That is, the widths of the eleventh through fourteenth driving lines TL11 through TL14 may be proportional to the line length.

For example, since a length of the fourteenth driving line TL14 is the longest among the eleventh through fourteenth driving lines TL11 through TL14, a width WT14' of the fourteenth driving line TL14 may be the largest. Since a length of the eleventh driving line TL11 is the shortest among the eleventh through fourteenth driving lines TL11 through TL14, a width WT11' of the eleventh driving line TL11 may be the smallest. The width WT11' of the eleventh driving line TL11 may be smaller than a width WT12' of the twelfth driving line TL12, the width WT12' of the twelfth driving line TL12 may be smaller than a width WT13' of the thirteenth driving line TL13, and the width WT13' of the thirteenth driving line TL13 may be smaller than the width WT14' of the fourteenth driving line TL14.

The width WT1' of the first driving line TL1 may be substantially equal to the width WT14' of the fourteenth driving line TL14. In addition, the width WT2' of the second driving line TL2 may be substantially equal to the width WT13' of the thirteenth driving line TL13. The width WT3' of the third driving line TL3 may be substantially equal to the width WT12' of the twelfth driving line TL12. In addition, the width WT4' of the fourth driving line TL4 may be substantially equal to the width WT11' of the eleventh driving line TL11.

In this case, a maximum width of each of the first through fourteenth driving lines TL1 through TL14 may be greater than the width of each of the first through twentieth. sensing lines RL1 through RL20 illustrated in FIGS. 11 through 14. The maximum width of each of the first through fourteenth driving lines TL1 through TL14 may be greater than the width of each of the twenty-first through fortieth sensing lines RL21 through RL40 illustrated in FIGS. 11 through 14. The maximum width of each of the first through fourteenth driving lines TL1 through TL14 may be the width WT1' of the first driving line TL1 or the width WT14' of the fourteenth driving line TL14.

In addition, a minimum width of each of the first through fourteenth driving lines TL1 through TL14 may be smaller than the width of each of the first through twentieth sensing lines RL1 through RL20 illustrated in FIGS. 11 through 14. The minimum width of each of the first through fourteenth driving lines TL1 through TL14 may be smaller than the width of each of the twenty-first through fortieth sensing lines RL21 through RL40 illustrated in FIGS. 11 through 14.

Resistances of the first through fourteenth driving lines TL1 through TL14 may be made substantially equal by designing the widths of the first through fourteenth driving lines TL1 through TL14 in consideration of the lengths of the first through fourteenth driving lines TL1 through TL14 as illustrated in FIGS. 18 and 19. Alternatively, the resistances of the first through fourteenth driving lines TL1 through TL14 may be distributed within a predetermined range.

Figure 20:
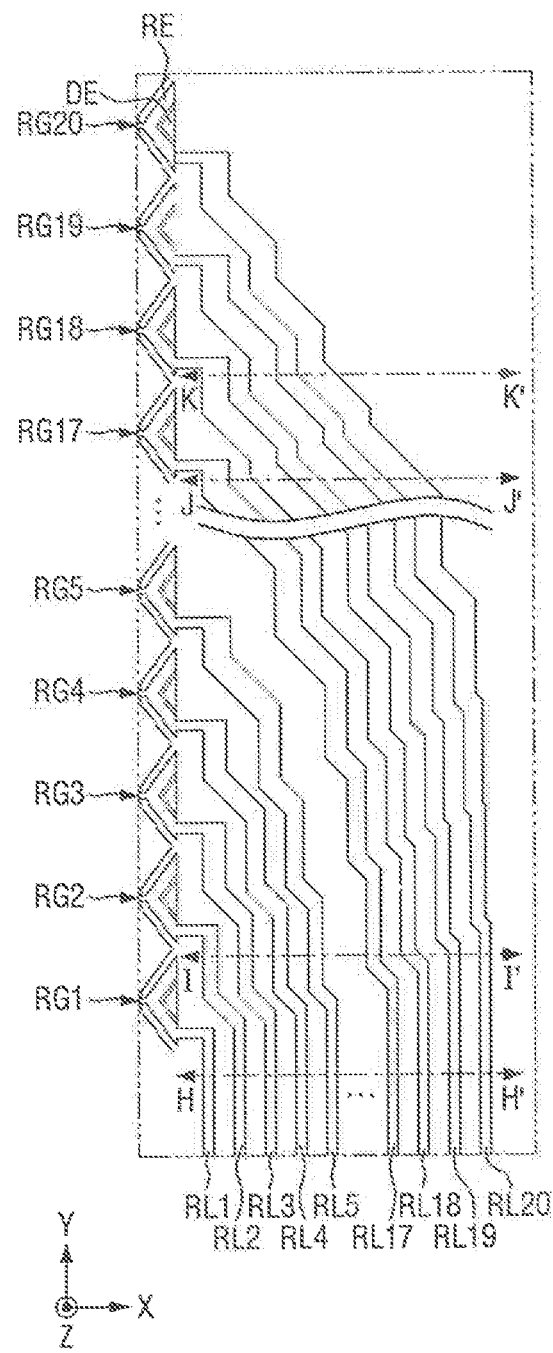
FIG. 20 is an enlarged layout view illustrating an example of area A of FIG. 4 in detail.
Figure 21:
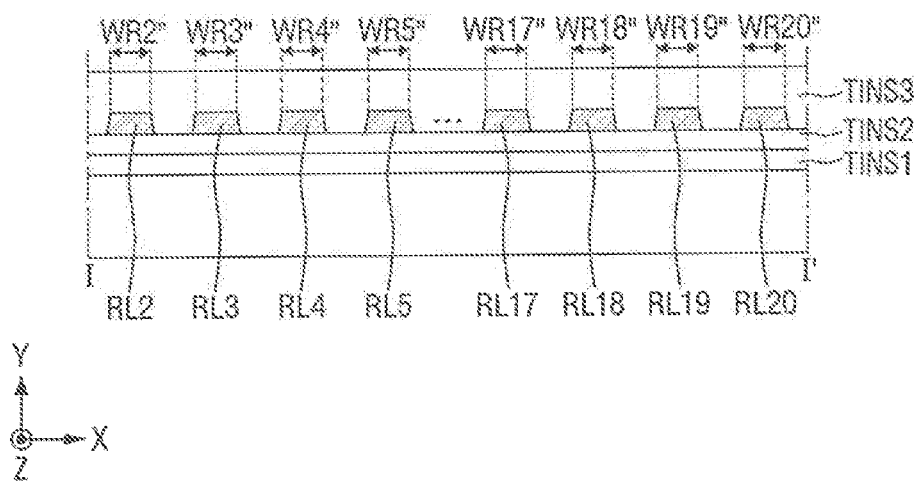
FIG. 21 is a cross-sectional view of an example of a touch sensing unit taken along line of FIG. 20.
Figure 22:
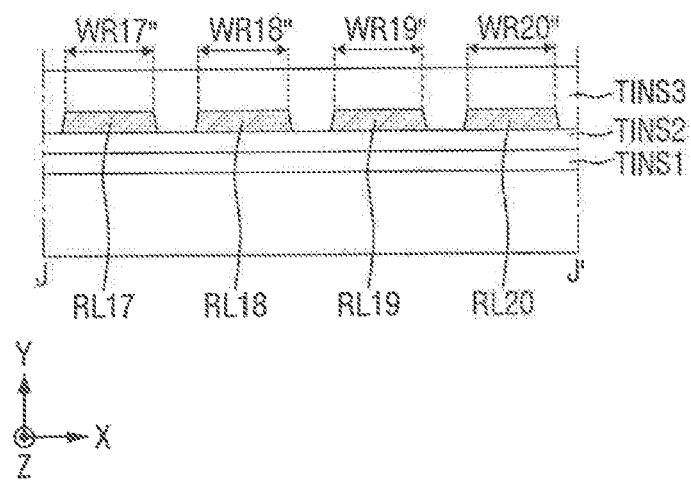
FIG. 22 is a cross-sectional view of an example of a touch sensing unit taken along line J-J' of FIG. 20.

FIG. 20 is an enlarged layout view illustrating an example of area A of FIG. 4 in detail. FIG. 21 is a cross-sectional view of an example of the touch sensing unit TDU taken along line I-I' of FIG. 20. FIG. 22 is a cross-sectional view of an example of the touch sensing unit TDU taken along line J-J' of FIG. 20.

An example of the touch sensing unit TDU taken along line H-H' of FIG. 20 is substantially the same as FIG. 12 and thus will not be described. In addition, an example of the touch sensing unit TDU taken along line K-K' of FIG. 20 is substantially the same as FIG. 22 except that a seventeenth sensing line RL17 is omitted, and thus will not be described.

The embodiment of FIGS. 20 through 22 is different from the embodiment of FIGS. 11 and 12 in that widths of first through fifth sensing lines RL1 through RL5 gradually increase in the second direction (Y-axis direction). In FIGS. 20 through 22, differences from the embodiment of FIGS. 11 and 12 will be mainly described, and a further description of some components and technical aspects previously described will be omitted.

Referring to FIGS. 20 through 22, the number of sensing lines overlapping a sensing electrode group in the first direction (X-axis direction) may decrease from a first sensing electrode group RG1 toward a fifth sensing electrode group RG5. Accordingly, widths of the sensing lines overlapping the sensing electrode group in the first direction (X-axis direction) may increase from the first sensing electrode group RG1 toward the fifth sensing electrode group RG5. Here, the widths of the sensing lines overlapping the sensing electrode group in the first direction (X-axis direction) may be substantially equal. That is, the first through fifth sensing lines RL1 through RL5 may be formed in the same line width extension manner.

For example, since the first sensing line RL1 is connected to the first sensing electrode group RG1, the number of sensing lines overlapping a second sensing electrode group RG2 in the first direction (X-axis direction) may be smaller than the number of sensing lines overlapping the first sensing electrode group RG1 in the first direction (X-axis direction). Accordingly, widths WR2", WR3", WR4", WR5", WR17", WR18", WR19" and WR20" of second through twentieth sensing lines RL2 through RL20 overlapping the second sensing electrode group RG2 in the first direction (X-axis direction) as illustrated in FIG. 21 may be greater than widths WR1, WR2, WR3, WR4, WR5, WR17, WR18, WR19 and WR20 of the first through twentieth sensing lines RL1 through RL20 overlapping the first sensing electrode group RG1 in the first direction (X-axis direction) as illustrated in FIG. 12, respectively. Here, the widths WR2", WR3", WR4", WR5", WR17", WR18", WR19" and WR20" of the second through twentieth sensing lines RL2 through RL20 overlapping the second sensing electrode group RG2 in the first direction (X-axis direction) as illustrated in FIG. 21 may be substantially equal. In addition, the widths WR1, WR2, WR3, WR4, WR5, WR17, WR18, WR19 and WR20 of the first through twentieth sensing lines RL1 through RL20 overlapping the first sensing electrode group RG1 in the first direction (X-axis direction) as illustrated in FIG. 12 may be substantially equal.

The number of sensing lines overlapping a sensing electrode group in the first direction (X-axis direction) may decrease from a seventeenth sensing electrode group RG17 toward a twentieth sensing electrode group RG20. However, in the case of the seventeenth through twentieth sensing electrode groups RG17 through RG20, widths of the sensing lines overlapping the sensing electrode group in the first direction (X-axis direction) may be substantially equal.

For example, the widths WR17", WR18", WR19" and WR20" of the seventeenth through twentieth sensing liners RL17 through RL20 overlapping the seventeenth sensing electrode group RG17 in the first direction (X-axis direction) as illustrated in FIG. 22 may be substantially equal to the widths WR18", WR19" and WR20" of the eighteenth through twentieth sensing lines RL18 through RL20 overlapping the eighteenth sensing electrode group RG18 in the first direction (X-axis direction). Here, the widths WR17", WR18". WR19" and WR20" of the seventeenth through twentieth sensing lines RL17 through RL20 overlapping the seventeenth sensing electrode group RG17 in the first direction (X-axis direction) as illustrated in FIG. 22 may be substantially equal. In addition, the widths WR18", WR19" and WR20" of the eighteenth through twentieth sensing lines RL18 through RL20 overlapping the eighteenth sensing electrode group RG18 in the first direction (X-axis direction) may be substantially equal.

When a maximum width of each of the seventeenth through twentieth sensing lines RL17 through RL20 exceeds about 30 µm, the seventeenth through twentieth sensing lines RL17 through RL20 may be visible to a user. Therefore, the maximum width of each of e seventeenth through twentieth sensing lines RL17 through RL20 may be about 30 µm or less according to embodiments of the present disclosure.

As illustrated in FIGS. 20 through 22, when the first through fifth sensing lines RL1 through RL5 are designed in the same line width extension manner in which the widths of the first through fifth sensing lines RL1 through RL5 gradually increase in the second direction (Y-axis direction), resistances of the first through twentieth sensing lines RL1 through RL20 may be designed uniformly.

Figure 23:
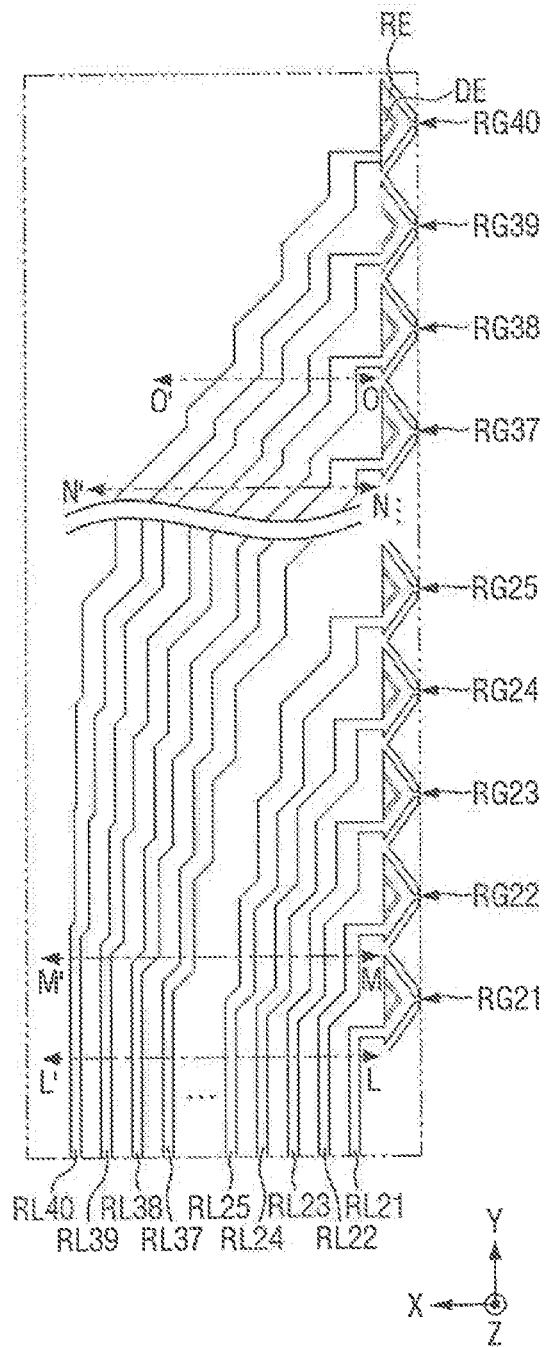
FIG. 23 is an enlarged layout view illustrating an example of area B of FIG. 4 in detail.
Figure 24:
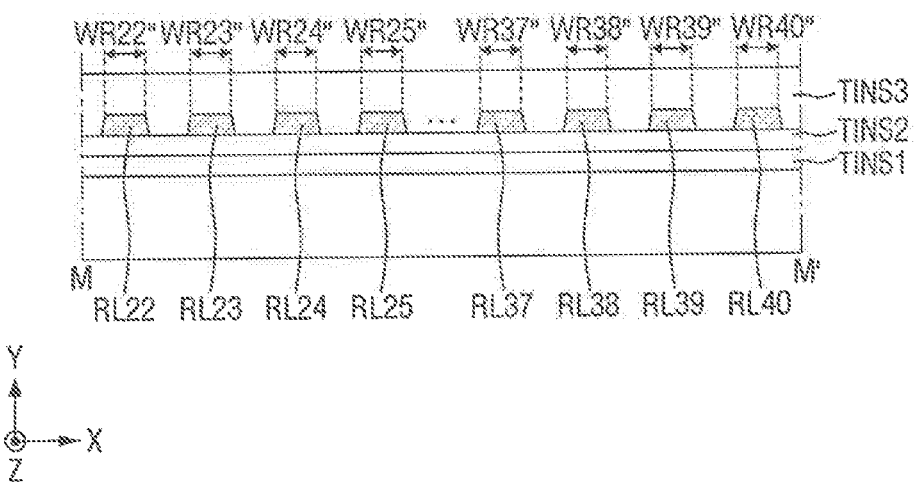
FIG. 24 is a cross-sectional view of an example of a touch sensing unit taken along M-M' of FIG. 23.
Figure 25:
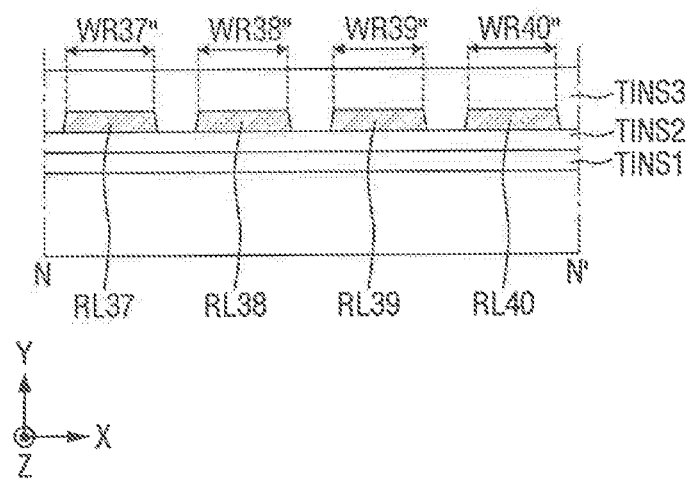
FIG. 25 is a cross-sectional view of an example of a touch sensing unit taken along line N-N' of FIG. 23.

FIG. 23 is an enlarged layout view illustrating an example of area B of FIG. 4 in detail. FIG. 24 is a cross-sectional view of an example of the touch sensing unit TDU taken along line M-M' of FIG. 23. FIG. 25 is a cross-sectional view of an example of the touch sensing unit TDU taken along line N-N' of FIG. 23.

An example of the touch sensing unit TDU taken along line L-L' of FIG. 23 is substantially the same as FIG. 14 and thus will not be described. In addition, an example of the touch sensing unit TDU taken along line O-O' of FIG. 23 is substantially the same as FIG. 25 except that a thirty-seventh sensing line RL37 is omitted, and thus will not be described.

The embodiment of FIGS. 23 through 25 is different from the embodiment of FIGS. 13 and 14 in that widths of twenty-first through twenty-fifth sensing lines RL21 through RL25 gradually increase in the second direction (Y-axis direction). In FIGS. 23 through 25, differences from the embodiment of FIGS. 13 and 14 will be mainly described, and a further description of some components and technical aspects previously described will be omitted.

Referring to FIGS. 23 through 25, the number of sensing lines overlapping a sensing electrode group in the first direction (X-axis direction) may decrease from a twenty-first sensing electrode group RG21 toward a twenty-fifth sensing electrode group RG25. Accordingly, widths of the sensing lines overlapping the sensing electrode group in the first direction (X-axis direction) may increase from the twenty-first sensing electrode group RG21 toward the twenty-fifth sensing electrode group RG25. Here, the widths of the sensing lines overlapping the sensing electrode group in the first direction (X-axis direction) may be substantially equal. That is, the twenty-first through twenty-fifth sensing lines RL21 through RL25 may be formed in the same linewidth extension manner.

For example, since the twenty-first sensing line RL21 is connected to the twenty-first sensing electrode group RG21, the number of sensing lines overlapping a twenty-second sensing electrode group RG22 in the first direction (X-axis direction) may be smaller than the number of sensing lines overlapping the twenty-first sensing electrode group RG21 in the first direction (X-axis direction). Accordingly, widths WR22", WR23", WR24", WR25", WR37", WR38", WR39" and WR40" of twenty-second through fortieth sensing liners RL22 through RL40 overlapping the twenty-second sensing electrode group RG22 in the first direction (X-axis direction) as illustrated in FIG. 24 may be greater than widths WR21, WR22, WR23, WR24, WR25, WR37, WR38, WR39 and WR40 of the twenty-first through fortieth sensing lines RL21 through RL40 overlapping the twenty-first sensing electrode group RG21 in the first direction (X-axis direction) as illustrated in FIG. 14, respectively. Here, the widths WR22", WR23", WR24", WR25", WR37", WR38", WR39" and WR40" of the twenty-second through fortieth sensing lines RL22 through RL40 overlapping the twenty-second sensing electrode group RG22 in the first direction (X-axis direction) as illustrated in FIG. 24 may be substantially equal. In addition, the widths WR21, WR22, WR23, WR24, WR25, WR37, WR38, WR39 and WR40 of the twenty-first through fortieth sensing lines RL21 through RL40 overlapping the twenty-first sensing electrode group RG21 in the first direction (X-axis direction) as illustrated in FIG. 14 may be substantially equal.

The number of sensing lines overlapping a sensing electrode group in the first direction (X-axis direction) may decrease franc a thirty-seventh sensing electrode group RG37 toward a fortieth sensing electrode group RG40. However, the case of the thirty-seventh through fortieth sensing electrode groups RG37 through RG40, widths of the sensing lines overlapping the sensing electrode group in the first direction (X-axis direction) may be substantially equal.

For example, the widths WR37", WR38", WR39" and WR40" of the thirty-seventh through fortieth sensing lines RL37 through RL40 overlapping the thirty-seventh sensing electrode group RG37 in the first direction (X-axis direction) as illustrated in FIG. 25 may be substantially equal to the widths WR38", WR39" and WR40" of the thirty-eighth through fortieth sensing lines RL38 through RL40 overlapping the thirty-eighth sensing electrode group RG38 in the first direction (X-axis direction). Here, the widths WR37", WR38", WR39" and WR40" of the thirty-seventh through fortieth sensing lines RL37 through RL40 overlapping the thirty-seventh sensing electrode group RG37 in the first direction (X-axis direction) as illustrated in FIG. 25 may be substantially equal. In addition, the widths WR38", WR39" and WR40" of the thirty-eighth through fortieth sensing lines RL38 through RL40 overlapping the thirty-eighth sensing electrode group RG38 in the first direction (X-axis direction) may be substantially equal.

When a maximum width of each of the thirty-seventh through fortieth sensing lines RL37 through RL40 exceeds about 30 µm, the thirty-seventh through fortieth sensing lines RL37 through RL40 may be visible to a user. Therefore, the maximum width of each of the thirty-seventh through fortieth sensing lines RL37 through RL40 may be about 30 µm or less according to embodiments of the present disclosure.

As illustrated in FIGS. 23 through 25, when the twenty-first through twenty-fifth sensing lines RL21 through RL25 are designed in the same line width extension manner in which the widths of the twenty-first through twenty-fifth sensing lines RL21 through RL25 gradually increase in the second direction (Y-axis direction), resistances of the twenty-first through fortieth sensing lines RL21 through RL40 may be designed uniformly.

If the embodiment of FIGS. 20 through 22 and the embodiment of FIGS. 23 through 25 are combined, the resistance of the twentieth sensing line RL20 may become smaller than the resistance of the twenty-first sensing line RL21. Therefore, to prevent the resistance of the twentieth sensing line RL20 from becoming smaller than the resistance of the twenty-first sensing line RL21, the embodiment of FIGS. 23 through 25 may be combined with the embodiment of FIG. 11 and FIG. 12 rather than with the embodiment of FIGS. 20 through 22.

In a touch sensing unit and a display device including the same according to embodiments of the present disclosure, a plurality of sensing lines disposed on the right side of a touch sensing area have substantially the same width as a plurality of sensing lines disposed on the left side of the touch sensing area. Therefore, the trend of a resistance slope of the sensing lines can be designed uniformly regardless of a process error. For this reason, a difference in the amount of change in mutual capacitance of each of touch nodes sensed through the sensing lines may be insignificant even if there is a process error. In his case, a reduction in the sensing capability of the touch sensing unit according to temperature and noise characteristics may be insignificant. Therefore, embodiments of the present disclosure may prevent or educe a reduction in the sensing quality of the touch sensing unit.

In a touch sensing unit and a display device including the same according to embodiments of the present disclosure, a plurality of sensing lines disposed on the right side of a touch sensing area have substantially the same width as a plurality of sensing lines disposed on the left side of the touch sensing area. Therefore, a width of a touch peripheral area disposed on the left side of the touch sensing area and the width of the touch peripheral area disposed on the right side of the touch sensing area can be reduced.

However, the effects of embodiments of the present disclosure are not restricted to those set forth herein.

While the present disclosure has been particularly shown and described with reference to embodiments thereof, it will be understood by those of ordinary skill in the art that various changes in form and detail may be made therein without departing from the spirit and scope of the present disclosure as defined by the following claims. The embodiments of the present disclosure described herein should be considered in a descriptive sense only and not for purposes of limitation.

What is claimed is:

1. A touch sensing unit, comprising:
a plurality of driving electrode groups arranged in a first direction, each of the driving electrode groups comprising a plurality of driving electrodes electrically connected to each other in a second direction intersecting the first direction;
a plurality of sensing electrode groups arranged in the second direction, each of the sensing electrode groups comprising a plurality of sensing electrodes electrically connected to each other in the first direction;
a plurality of driving lines connected to corresponding ones of the driving electrode groups, respectively;
a first sensing line group comprising sensing lines respectively connected to corresponding ones of first sensing electrode groups among the sensing electrode groups; and
a second sensing line group comprising sensing lines respectively connected to corresponding ones of second sensing electrode groups among the sensing electrode groups,
wherein widths of each of the sensing lines of the first sensing line group are equal to each other.

2. The touch sensing unit of claim 1, wherein widths of the sensing lines of the second sensing line group are substantially equal to each other.

3. The touch sensing unit of claim 2, wherein the widths of each of the sensing lines of the first sensing line group and the widths of each of the sensing lines of the second sensing line group are equal to each other.

4. The touch sensing unit of claim 1, wherein each of the sensing lines of the first sensing line group is connected to a first side of a corresponding first sensing electrode group among the first sensing electrode groups, and each of the sensing lines of the second sensing line group is connected to a second side of a corresponding second sensing electrode group among the second sensing electrode groups.

5. The touch sensing unit of claim 4, wherein a length of any one of the sensing lines of the first sensing line group is smaller than a length of any one of the sensing lines of the second sensing line group.

6. The touch sensing unit of claim 1, wherein a resistance slope of the sensing lines of the first sensing line group is different from a resistance slope of the sensing lines of the second sensing line group.

7. The touch sensing unit of claim 6, wherein the resistance slope of the sensing lines of the first sensing line group is greater than the resistance slope of the sensing lines of the second sensing line group.

8. The touch sensing unit of claim 1, wherein a resistance slope of the sensing lines of the first sensing line group is constant.

9. The touch sensing unit of claim 1, wherein a resistance slope of the sensing lines of the second sensing line group is variable.

10. The touch sensing unit of claim 1, wherein widths of the driving lines are substantially equal to each other.

11. The touch sensing unit of claim 1, wherein resistances of the driving lines are substantially equal to each other.

12. The touch sensing unit of claim 1, wherein a width of any one of the driving lines is different from a width of another one of the driving lines.

13. The touch sensing unit of claim 12, wherein the width of each of the sensing lines of the first sensing line group and a width of each of the sensing lines of the second sensing line group is smaller than a maximum width of each of the driving lines.

14. The touch sensing unit of claim 12, wherein the width of each of the sensing lines of the first sensing line group and a width of each of the sensing lines of the second sensing line group is greater than a minimum width of each of the driving lines.

15. The touch sensing unit of claim 1,
wherein the sensing lines of the first sensing line group comprise a first sensing line connected to a first sensing electrode group among the first sensing electrode groups and a second sensing line connected to a second sensing electrode group among the second sensing electrode groups,
wherein a width of the second sensing line at a portion overlapping the first sensing electrode group in the first direction is different from a width of the second sensing line at a portion overlapping the second sensing electrode group in the first direction.

16. The touch sensing unit of claim 15, wherein a length of the second sensing line is greater than a length of the first sensing line.

17. The touch sensing unit of claim 16, wherein the width of the second sensing line at the portion overlapping the first sensing electrode group in the first direction is smaller than the width of the second sensing line at the portion overlapping the second sensing electrode group in the first direction.

18. The touch sensing unit of claim 15, wherein widths of the first sensing line and the second sensing line at the portion overlapping the first sensing electrode group in the first direction are substantially equal to each other.

19. A touch sensing unit, comprising:
- a plurality of driving electrode groups arranged in a first direction, each of the driving electrode groups comprising a plurality of driving electrodes electrically connected to each other in a second direction intersecting the first direction;
- a plurality of sensing electrode groups arranged in the second direction, each of the sensing electrode groups comprising a plurality of sensing electrodes electrically connected to each other in the first direction;
- a plurality of driving lines connected to corresponding ones of the driving electrode groups, respectively;
- a first sensing line group comprising sensing lines respectively connected to corresponding ones of first sensing electrode groups among the sensing electrode groups; and
- a second sensing line group comprising sensing lines respectively connected to corresponding ones of second sensing electrode groups among the sensing electrode groups,
- wherein widths of each of the sensing lines of the first sensing line group and widths of each of the sensing lines of the second sensing line group are equal to each other,
- wherein a resistance slope of the sensing lines of the first sensing line group is different from a resistance slope of the sensing lines of the second sensing line group.

20. The touch sensing unit of claim 19, wherein the resistance slope of the sensing lines of the first sensing line group is greater than the resistance slope of the sensing lines of the second sensing line group.

21. The touch sensing unit of claim 19, wherein the resistance slope of the sensing lines of the first sensing line group is constant.

22. The touch sensing unit of claim 19, wherein the resistance slope of the sensing lines of the second sensing line group is variable.

23. A display device, comprising:
- a display unit comprising a display area having a plurality of pixels that display an image; and
- a touch sensing unit comprising a touch sensing area overlapping the display area,
- wherein the touch sensing unit comprises:
  - a plurality of driving electrode groups arranged in a first direction, each of the driving electrode groups comprising a plurality of driving electrodes electrically connected to each other in a second direction intersecting the first direction;
  - a plurality of sensing electrode groups arranged in the second direction, each of the sensing electrode groups comprising a plurality of sensing electrodes electrically connected to each other in the first direction;
  - a plurality of driving lines connected to corresponding ones of the driving electrode groups, respectively;
  - a first sensing line group comprising sensing lines respectively connected to corresponding ones of first sensing electrode groups among the sensing electrode groups; and
  - a second sensing line group comprising sensing lines respectively connected to corresponding ones of second sensing electrode groups among the sensing electrode groups,
  - wherein widths of each of the sensing lines of the first sensing line group are equal to each other.

24. The display device of claim 23,
wherein the first sensing line group is disposed on a first side of the display area, and the second sensing line group is disposed on a second side of the display area that opposes the first side.

* * * * *